(12) United States Patent
Berg et al.

(10) Patent No.: US 6,817,026 B2
(45) Date of Patent: Nov. 9, 2004

(54) MAGNETIC HUB ASSEMBLY FOR DATA STORAGE DISK

(75) Inventors: Thomas E. Berg, Fort Collins, CO (US); Scott D. Abrahamson, Longmont, CO (US); Robert D. Freeman, Erie, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 582 days.

(21) Appl. No.: 09/746,265

(22) Filed: Dec. 21, 2000

(65) Prior Publication Data

US 2001/0036149 A1 Nov. 1, 2001

Related U.S. Application Data

(63) Continuation-in-part of application No. 09/560,781, filed on Apr. 28, 2000.

(51) Int. Cl.[7] .................. G11B 23/03; G11B 17/02
(52) U.S. Cl. .................................................. 720/721
(58) Field of Search ................... 369/270, 290; 360/99.05, 99.08

(56) References Cited

U.S. PATENT DOCUMENTS

| | | | | | |
|---|---|---|---|---|---|
| 4,829,510 A | * | 5/1989 | Takahashi | ................... | 369/290 |
| 4,847,826 A | * | 7/1989 | Sakaguchi et al. | .......... | 369/270 |
| 4,881,218 A | * | 11/1989 | Yamamori | ................... | 369/289 |
| 4,903,224 A | * | 2/1990 | Namiki et al. | .............. | 369/290 |
| 4,981,743 A | | 1/1991 | Ho | .............................. | 428/64 |
| 5,057,960 A | * | 10/1991 | Shiba et al. | ................ | 360/133 |
| 5,080,736 A | | 1/1992 | Matsui | ......................... | 156/64 |
| 5,323,381 A | * | 6/1994 | Takahashi et al. | .......... | 369/282 |
| 5,448,553 A | * | 9/1995 | Suzuki et al. | ............... | 369/290 |
| 5,572,509 A | * | 11/1996 | Kobayashi et al. | ......... | 369/290 |
| 5,590,115 A | * | 12/1996 | Kubo | ......................... | 369/290 |
| 5,657,311 A | * | 8/1997 | Takahashi | ................... | 369/290 |
| 5,709,764 A | | 1/1998 | Funawatari et al. | ..... | 156/275.7 |
| 5,774,440 A | | 6/1998 | Kimura et al. | ................ | 369/59 |
| 5,796,709 A | * | 8/1998 | Ootsuka | ..................... | 369/271 |
| 5,859,834 A | * | 1/1999 | Takahashi et al. | .......... | 369/290 |
| 5,874,147 A | | 2/1999 | Bojarczuk, Jr. et al. | .... | 428/641 |
| 6,153,063 A | | 11/2000 | Yamada et al. | ........ | 204/192.22 |

FOREIGN PATENT DOCUMENTS

| | | | | |
|---|---|---|---|---|
| EP | 0278358 | * | 8/1988 | ........... G11B/17/22 |
| EP | 0286032 | * | 10/1988 | ........... G11B/23/00 |
| EP | 0 301 829 | | 2/1989 | ........... G11B/7/24 |
| EP | 0 301 866 | | 2/1989 | ........... G11B/23/00 |
| EP | 0 386 971 | | 9/1990 | ........... G11B/7/26 |
| EP | 0 475 197 | | 3/1992 | ........... G11B/7/24 |
| EP | 0 488 388 | | 6/1992 | ........... G11B/23/00 |
| EP | 0 519 768 | | 12/1992 | ........... G11B/7/00 |
| EP | 0 555 486 | | 8/1993 | ........... G11B/23/00 |
| EP | 0 802 530 | | 10/1997 | ........... G11B/7/24 |
| GB | 2 203 886 | | 10/1988 | ........... G11B/7/24 |
| WO | WO 00/72312 | | 11/2000 | |
| WO | WO 00/79526 | | 12/2000 | ........... G11B/7/24 |

* cited by examiner

*Primary Examiner*—William Korzuch
*Assistant Examiner*—Christopher R Magee
(74) *Attorney, Agent, or Firm*—MacPherson Kwok Chen & Heid LLP

(57) ABSTRACT

A hub assembly for a data storage disk including a hub member and a raised boss near a center axis of the hub member, the raised boss being surrounded by an annular bonding surface and being configured so as to protrude into a center hole of a data storage disk when the bonding surface is in contact with a surface of the disk.

10 Claims, 23 Drawing Sheets

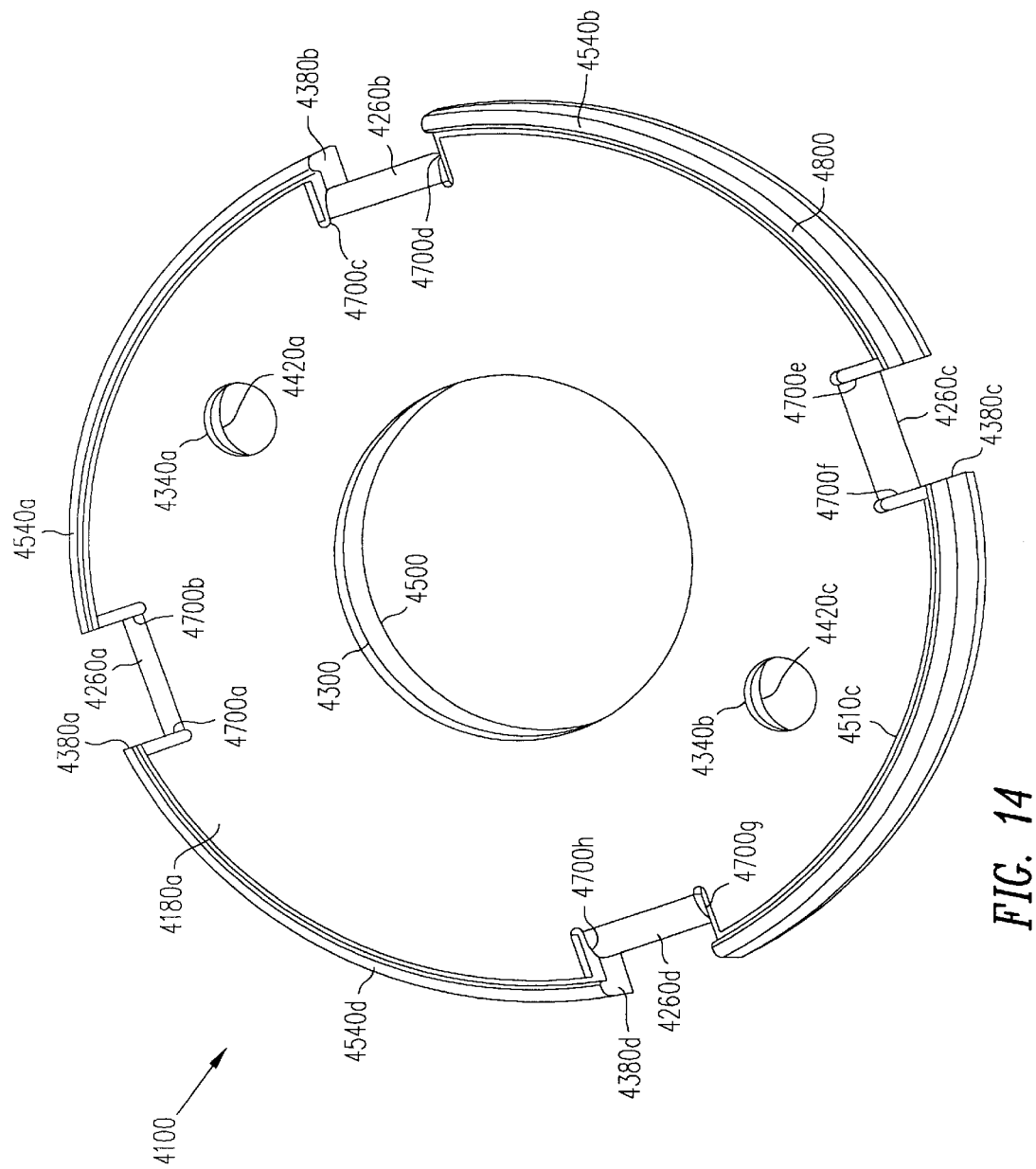

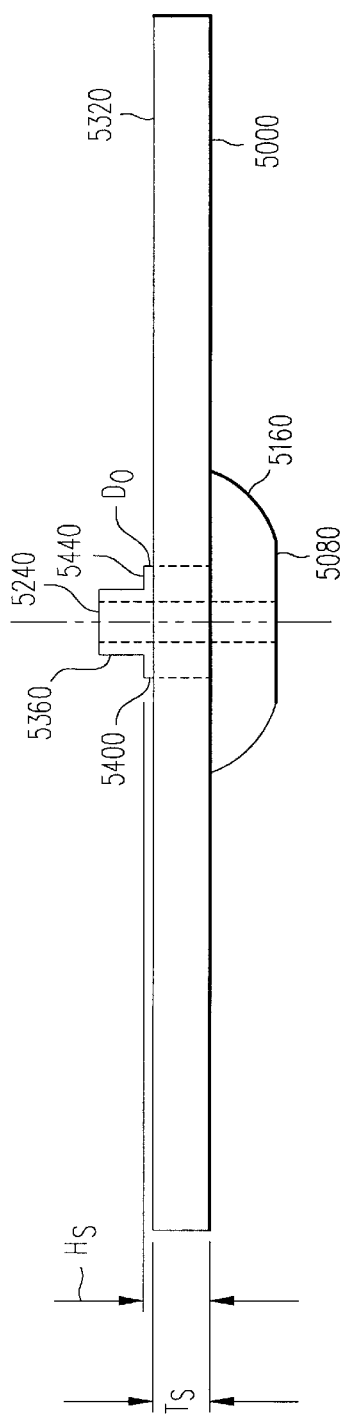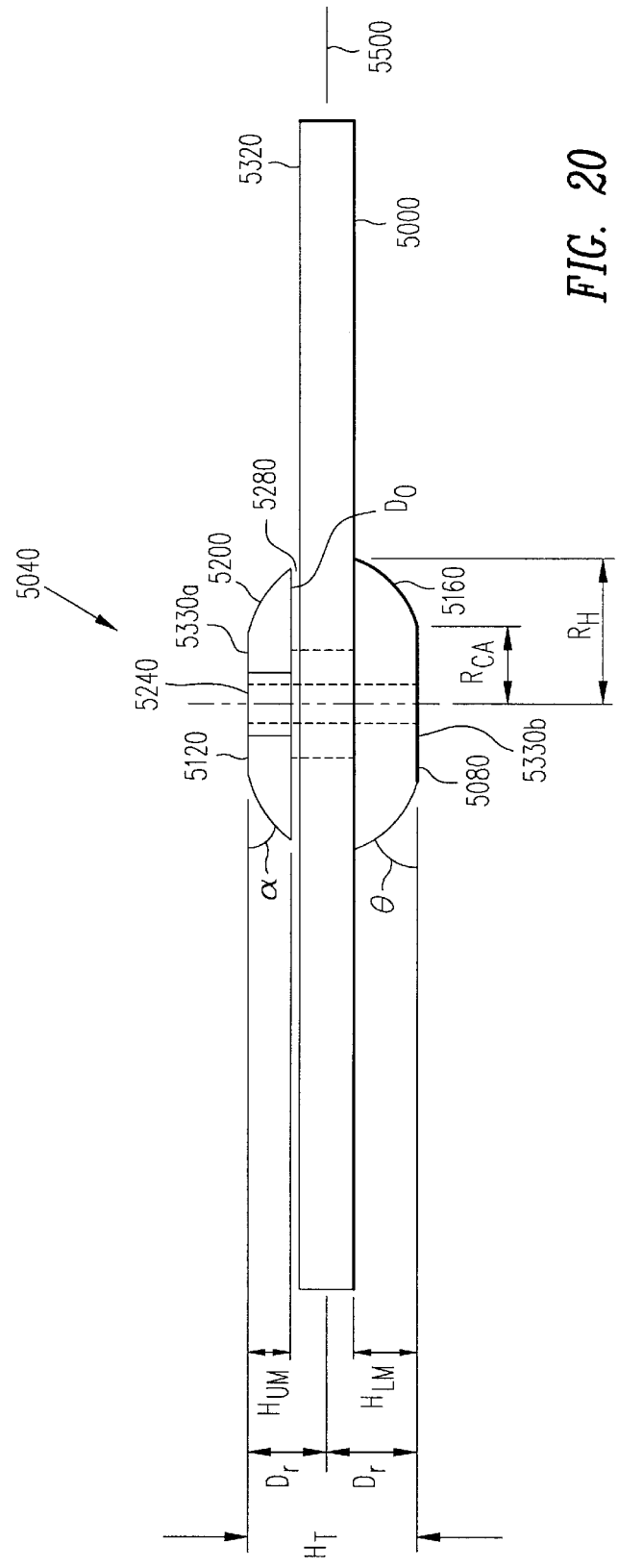

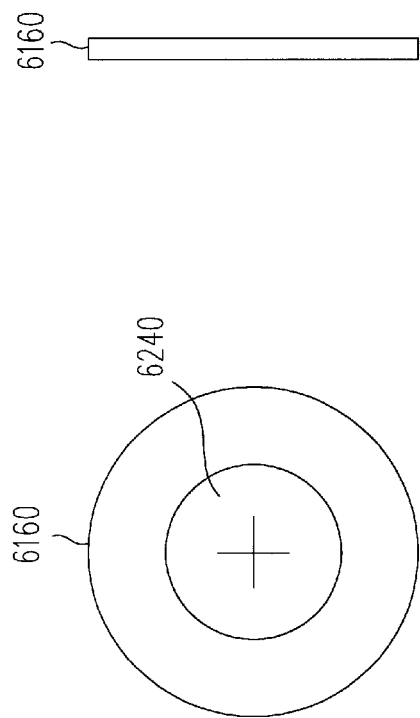
FIG. 25
FIG. 26
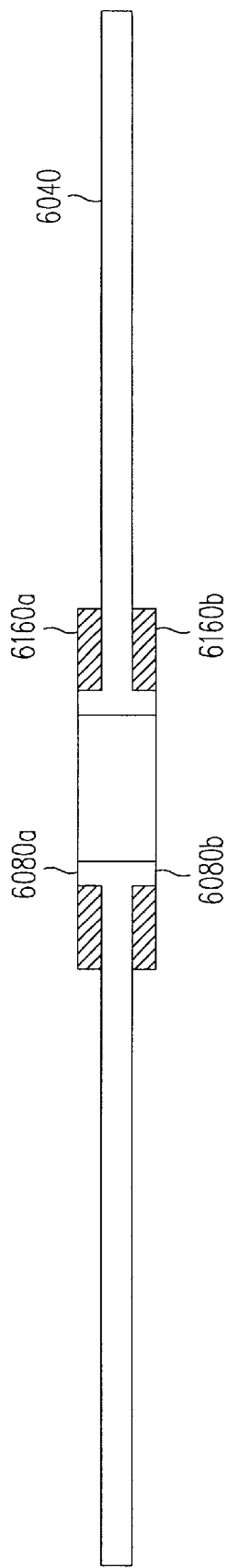
FIG. 27

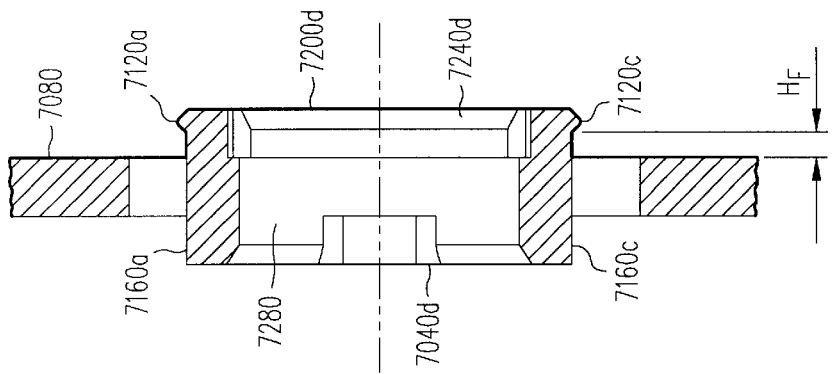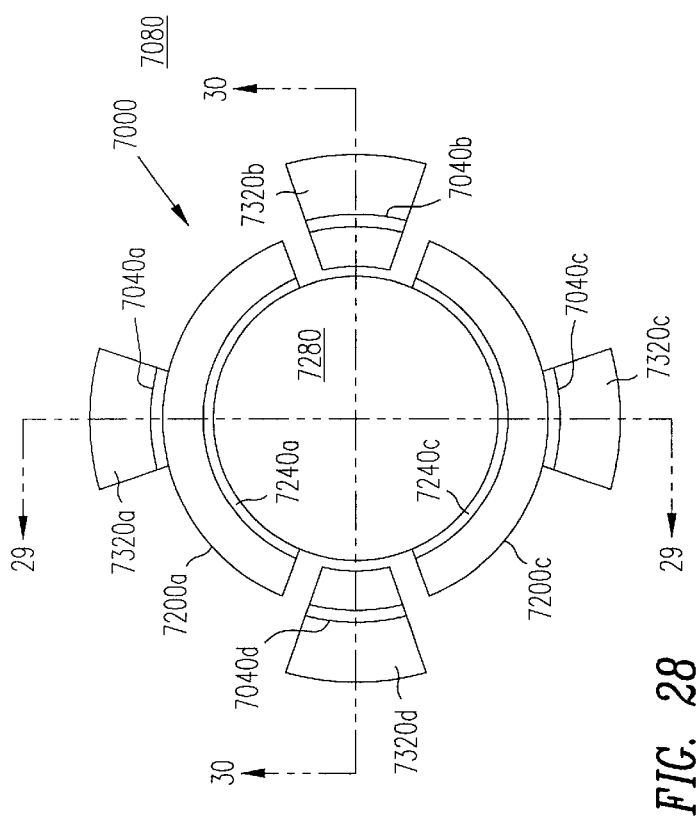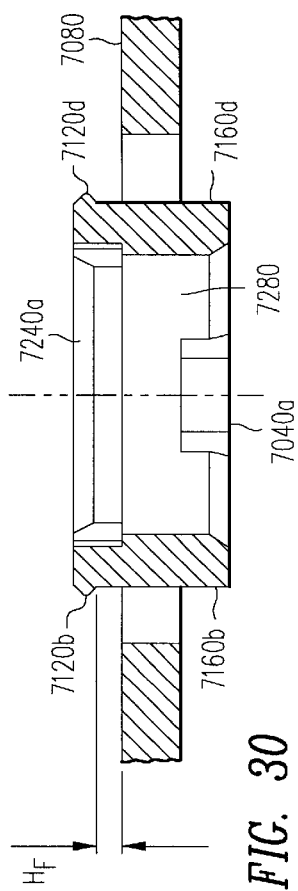

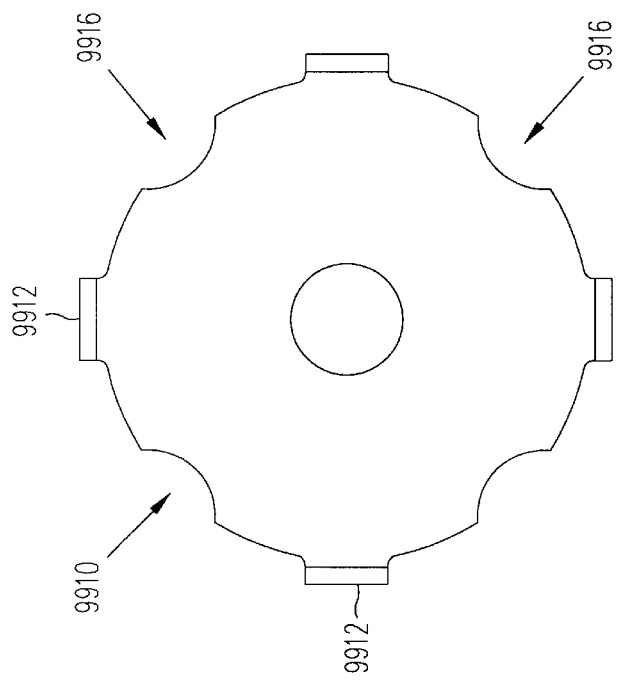
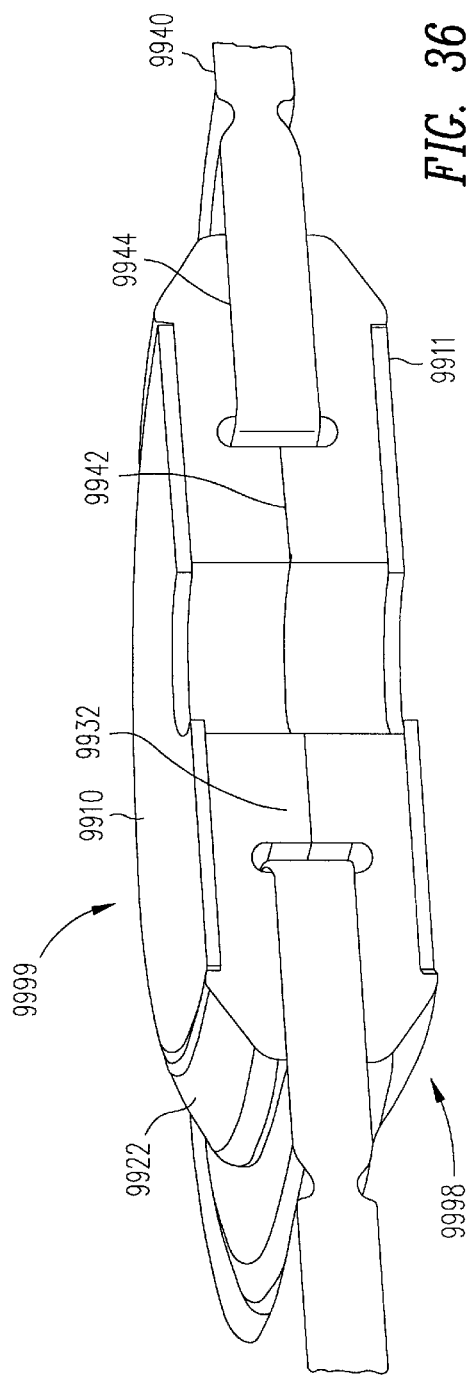

MAGNETIC HUB ASSEMBLY FOR DATA STORAGE DISK

CROSS-REFERENCE TO RELATED APPLICATIONS

This application is a continuation-in-part of application Ser. No. 09/560,781, filed Apr. 28, 2000, entitled "Miniature Optical Disk For Data Storage", which is incorporated herein by reference in its entirety.

This application is related to application Ser. No. 09/745,597, filed herewith, now U.S. Pat. No. 6,619,100, entitled "Crimping Tool For Metal Hub Plate"; and application Ser. No. 09/745,399, filed herewith, entitled "Method Of Aligning And Mounting Data Storage Disk On Hub Member"; each of which is incorporated herein by reference in its entirety.

FIELD OF THE INVENTION

The present invention is directed generally to optical data storage media and specifically to optical data storage media for small-form-factor drives.

BACKGROUND OF THE INVENTION

A number of disk-shaped optical storage media have been developed for use in storing various types of digital data in a manner such that the media can be readily removed from the read/write machine or drive for which it is designed. Common current (typically read-only) examples include the compact disk (CD) and digital versatile disk (DVD). Although these examples have been highly successful for particular applications, such as storing data for use on a personal computer (PC), or storing music or other audio or video information, such as motion pictures, these devices have proved less useful in applications where, for practical, historical or other reasons, an optical storage medium with a smaller size is preferable. One class of such application includes various personal electronic devices (PEDs). Personal electronic devices in general have a size, shape and weight such that it is feasible and convenient to carry or wear such devices on the person. Typically, to be practical, such devices need to be substantially pocket-sized (e.g. no more that about 100 mm, preferably no more than about 50 mm in the longest dimension, and preferably not having any cross section that is more than about 100 mm by about 50 mm, preferably no more than about 75 mm by about 35 mm) and/or a mass of about ⅓ kg or less. Examples of personal electronic devices include digital cameras, music reproduction equipment such as small tape players with headphones or MP3 players, cellular telephones, dictating equipment, at least some types of small computers, known as personal digital assistants (PDAs), and the like.

Owing, at least in part, to the great popularity of personal electronic devices and the fact that certain personal electronic devices store (and/or utilize pre-stored) data, there is a need for a data storage system and/or medium which is compatible with at least the size and weight constraints of personal electronic devices. Various types of storage systems have been used or proposed for some or all kinds of personal electronic devices, but have proved to be less than ideal for certain applications, e.g. in terms of storage capacity, size, power consumption, data transfer, cost, and/or convenience.

By way of example only, one technique for storing images in digital cameras involves use of electronic flash cards. However, the cost to the consumer in storing one picture using such flash cards is substantial. Since one picture typically requires more than 5 megabytes of storage, the cost of storage is about $20/picture, based on current prices of these cards. Moreover, these electronic cards or media are considered nonarchival (i.e., archival memory, without refresh or similar operations, is substantially free from data loss over an extended period, such as ten years or more). Accordingly, it would be advantageous, particularly in light of the photographic film paradigm, to which many photographers are accustomed, to provide a system and archival storage medium usable in a digital camera in which the cost, to the consumer, per image or picture is reduced, e.g. compared to current electronic media used in connection with digital cameras.

For transfer of stored information to a non-PED or peripheral device, PED's typically have a serial port. Particularly in digital cameras, the time required to transfer one or more stored images to a peripheral device via the serial port is unacceptably long. By way of example, a common serial port has a maximum data transfer rate of approximately 12 kBytes/second. A typical digital camera has more than 2 megapixels/image which equates to about 5 megabytes of uncompressed high resolution information. The time typically required to transfer the image from the digital camera via the serial port to a peripheral device will be at least 400 seconds or more.

In addition to the storage medium being configured for accommodation in a PED, it is advantageous to provide a removable medium which is sized to facilitate handling and storage by typical consumers. It is believed that there is a practical lower limit on the size of such media, e.g. since units which are too small will be susceptible to being lost or misplaced and may be difficult for consumers to handle, particularly those with limited movement or disabilities. Thus, the removable media preferably are not substantially smaller than items which are generally near the lower limit of what may readily be handled, such as coins, stamps, and the like. Accordingly, it would be advantageous to provide a removable storage medium which is not significantly smaller, in width or length, than about an inch (i.e. not significantly smaller than about 25 mm). Additionally, the removable medium is advantageously not so large that it becomes cumbersome to store or transport, and preferably is sufficiently small that it can readily be incorporated in PEDs. Accordingly it would be advantageous to provide a removable storage medium which is not significantly larger, in width or length than about 40 mm, preferably not significantly larger than about 35 mm. In contrast, the standard CD or DVD disk is about 120 mm in diameter, which is believed too large to be accommodated in a pocket-sized camera or to be, itself, considered PED-sized.

Accordingly, it would be useful to provide a data recording system which provides a removable medium, preferably archival, with a high-transfer rate, lower power consumption and large capacity, but which is sized for effective and convenient consumer use (e.g. with largest dimensions about 25–50 mm) and so as to be accommodated in relatively compact digital cameras, such as digital cameras with a size, shape and/or weight not substantially exceeding that of corresponding film cameras.

With respect to optical media types, one classification relates to their read and/or write capabilities or functions relative to information content portions of the medium. The information content portions can be generally characterized as that part of the optical medium that information is read from and/or written to. The information content portions are often, but need not be, a composite layer comprised of two or more thin films on which information is recorded (written) and/or from which information is obtained (read). According to this, optical media, or any portion thereof, can be classified as: read-only, write-once, and rewriteable. A read-only optical medium refers to a medium in which data or other information is only read from the optical medium under control of the consumer or user thereof. There is no writing or recording by the user, after the read-only optical medium has been produced or manufactured. The write-once optical medium, or any portion thereof, refers to a medium or portion thereof in which the consumer or user is able to control the recording or writing information only once on the optical medium or portion thereof. After the write-once optical medium or portion thereof has information recorded thereon by the user, the write-once optical medium is not to be written to again. That is, if a portion of the medium has been written to in which a mark is provided thereon, that portion cannot be written to again, although any other portion that does not have a mark could be written to. In one embodiment, the information content portions of the write-once optical medium can have an amorphous structure or state before recording. As part of the recording operation, the amorphous structure of the information content portions is transformed into a crystalline structure having the stored information. In one embodiment, the information layer of the write-once optical medium could also be comprised of dye-based or, alternatively, ablative materials. The rewriteable optical medium refers to a medium in which the information content portions may have information recorded thereon many times; in some cases, essentially without limit where the medium can be erased or over-written a substantial number of cycles and, in other cases, there is a finite limit where phase transition materials constitute the material structure of the medium.

With respect to a read-only optical medium, the read-only information can be provided thereon by injection molding, which results in pits or bumps being recorded as the information content portions. These indicia are indicative of recorded data or other information. Although injection molding may be preferred, such information can also be embossed. With respect to writeable (write-once, and, rewriteable) optical media, grooves are typically formed in their substrates. The grooves are utilized in locating proper positions for information to be recorded. Such information is typically recorded in the form of marks spaces, which are indicative of binary information. The marks and spaces are distinguished from each other by their different reflectivities and/or optical phase.

In accordance with known and prior art practice, each of the above-defined optical media can be further characterized as being second-surface media. In accordance with one definition, second-surface optical media can be defined in terms of the read operation that is conducted when reading information from the media. In particular, a second-surface optical medium can refer to a medium in which the read beam is incident on the substrate of the optical medium or disk before it is incident on the information layer.

The relatively thick and transparent substrate of second-surface optical media makes read-only or read-write operations relatively insensitive to dust particles, scratches and the like which are located more than 50 wavelengths from the information layer. On the other hand, the second-surface optical medium can be relatively sensitive to various opto-mechanical variations. For example, common opto-mechanical variations include: (1) tilt of the substrate relative to the optical axis; (2) substrate thickness variations; and/or (3) substrate birefringence.

These variations give rise to optical aberrations which degrade system performance arising from the presence of the thick transparent layer and which can, at least theoretically, be partially compensated for by using a suitable optical path design. Such an optical path typically can only provide compensation for a single, pre-defined thickness of the layer. Because there are likely to be variations in the thickness or other properties of the transparent layer, such compensation may be less than desired at some locations of the medium.

Because the transparent layer is typically formed from a non-conductive material, there is a further risk that rotation or similar movement of the medium will create sufficient static electrical charge that dust particles or other debris may be attracted to and may adhere to the operational surface of the medium.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the recording layer. To provide the longer working distance, larger optical components (e.g., objective lens) are required.

A major contributor to on-track error rates in optical disk drive reading and writing is the improper positioning of the optical head relative to track location on the rotating disk. A "track" is a portion of the spiral or concentric data track of a typical optical disk which follows the spiral or circle for one rotation of the disk. For example, misalignment of the objective lens relative to the center of the track can cause the optical head to read information from and/or write information onto adjacent tracks. The resulting noise can reduce the signal-to-noise ratio, leading to increased error rates. This can be caused by eccentricity of the radial tracks on the disk relative to a reference or a point on the disk drive. Eccentricity or runout can result from the disk and/or tracks being positioned off-center in the disk drive and/or improper vertical alignment of the plane of the disk relative to the disk drive. It is also important to provide a high degree of concentricity on a repeatable basis. Accordingly, it would be useful to provide a method for decreasing the degree of eccentricity of the tracks relative to the disk drive and of vertical misalignment of the disk relative to the disk drive.

To achieve a small-form-factor drive, it is important to provide a medium or disk and disk cartridge having a low profile. Space is limited in combining various disk drive components for containment in the drive's small form factor. In that regard, the optical medium or disk drive system can be characterized as having three major subsystems or components that meaningfully contribute to the total profile or height of the optical disk drive system. Generally, these major subsystems of the disk drive system contribute about equally to the total profile. These three subsystems are the height or profile of the spin motor, the optical elements and the cartridge assembly. The cartridge assembly can be defined as including the optical medium or disk, the hub assembly and the cartridge housing. Consequently, as part of providing a low profile drive, it is beneficial to provide a disk having a low profile mounting hub assembly.

SUMMARY OF THE INVENTION

In accordance with the present invention, a number of components of an optical system are provided including an optical medium or disk. The optical medium has a number of characterizing features related to being capable of storing substantial amounts of data or other information yet having a small diameter. The optical medium can be implemented as a read only-medium, a writeable medium, such as a write-once medium or a rewriteable medium, as well as combinations thereof. The optical medium can be configured to enhance power efficiency when information is written to it. The medium can be readily made and formatted, as well as being efficiently assembled with other optical system components, such as a hub assembly, cartridge assembly and optical drive.

In the preferred embodiment, the optical medium is a first-surface medium. Although it may be subject to more than one definition, in one embodiment, the first-surface optical medium refers to a medium in which the read beam during a read operation is incident on or impinges on information content portions of the first-surface optical medium before it impinges on a substrate of the first-surface optical medium. The "information content portions" can be defined as portions of the optical medium that store or contain servo data, address data, clock data, user data, system data, as well as any other information that is provided on the optical medium. The "information content portions" can be integral with the substrate such as the case of a read-only medium. The information content portions can also be separately provided. In such a case, the information content portions can be, for example, an information layer of a writeable medium.

In one additional or alternative definition, the first-surface optical medium can refer to an optical medium having a tangible thickness in which a read light beam during a read operation traverses less than 100 micrometers of this thickness before impinging on the information content portions.

In one embodiment, the "substrate" can be defined as an optical medium layer that is at least 100 micrometers (0.1 mm) in thickness. Alternatively or additionally, the substrate can also be defined as being an optical medium layer that is contiguous with the information layer. Alternatively or additionally, the substrate can also be defined as being greater in thickness than any other layer of the optical medium that has a substantially homogenous composition. In those cases in which the information layer is a composite layer or multi-film layer, these definitions may apply to a part of the composite information layer or to one or more films of the multi-film information layer.

The first-surface medium offers numerous advantages over a second-surface medium. By way of example, with first-surface medium, the radiation does not pass through the relatively thick substrate so that there is a relatively shorter optical path, in comparison with second-surface medium, thereby providing a significantly shorter working distance, in comparison with second-surface medium. Since there is a shorter working distance, a smaller objective lens diameter, for a given numerical aperture, can be utilized which results in smaller, lower mass optical components to achieve a greater degree of optical drive miniaturization. Furthermore, the first-surface medium is not sensitive to substrate birefringence and substrate thickness variations. The first-surface medium is also much less sensitive to substrate tilt.

Returning to a discussion of its structural features, the optical medium has an outer diameter of about 40 mm or less (and more typically about 35 mm or less (e.g., 32 mm±10%) and a thickness of about 0.6 mm (e.g., 0.6 mm±15%)). A data field, a lead out track and a lead in track are located on the optical medium. The lead-in and/or lead-out tracks contain information for servo location and for preventing over- and underscans by the optical head. The lead-out track is at a lead-out radius from a center of the optical medium. The lead-in track is located at a lead-in radius from the center of the optical medium. A data field is located between the lead-out and lead-in tracks. In one embodiment, the lead-out radius is no greater than about 6.5 mm and the lead in radius is no greater than about 16 mm. In one configuration, the lead-in track is located outwardly relative to the lead-out track (i.e., the lead out track is located closer to the disk center than the lead-in track). The small form of the medium is readily handled, transported and/or stored by consumers. The medium is sufficiently small that it may be stored in a PED (personal electronic device). In one configuration, the first-surface optical medium has an information layer with a data density of about 2.6 gigabytes per square inch of data surface for a total capacity of about 250 Megabytes per medium side.

The first-surface optical storage medium or disk has at least one (i.e. single-sided), and typically two (i.e. double-sided), information layers. Each layer can include information content mastered (ICM) data (which is typically read-only) and/or writeable areas (write-once and rewriteable). As discussed in Serial No. 60/140,633, supra, the ICM data can be provided on the optical storage medium substantially all at once. The writeable portions can be relatively long-lived and/or write-once (not rewriteable) so as to provide archival storage, and/or the techniques for forming the two areas can be substantially the same with the areas differing substantially only as to whether or not the region has content molded (or otherwise mastered) therein. For example, a molding or embossing process can be used not only for mastered content but also for formatting, sector, focus, tracking and/or test areas in the (otherwise) writeable region of the disk.

In one configuration, the disk is available for use immediately after molding or embossing procedures. This configuration constitutes a monolithic disk structure in which the optical disk does not have a coating and is not subject to secondary treatment; rather, the monolithic disk can be used as is, at least for reading information therefrom. In another embodiment, additional, later steps are provided such as applying reflective coatings to improve reflectivity, applying one or more writeable film(s), e.g., a phase change material such as TeO, GeTeSb, chalcogenide alloys or metal alloys such as InSbSn or a dye material such as cyanines or pthalcocyanines, and/or applying a protective and/or contrast enhancing coating. The ICM data or writeable areas can be on opposing or common surfaces of the optical storage medium. The medium is particularly useful at beam wavelengths preferably ranging from about 400 to about 1100 nm and more preferably from about 635 to about 675 nm when achieving data storage of about 250 Megabytes/optical medium side. In one embodiment, the optical storage medium might store read only information (e.g. audio) in a compressed format on one side thereof, while the opposing side of the medium has promotional or other commercial information, such as one or more advertisements. The format of the read only information can be based on an industry standard for such optical storage media.

The components of an optical system also include a hub assembly that is joined to the optical storage medium. The hub assembly has first and second outer surfaces. A total height of the hub assembly is defined between the first and second outer surfaces when the hub assembly is joined to the optical storage medium. When both sides of the optical storage medium are being used to store information, the ratio of the total height of the hub assembly to the thickness of the optical storage medium is at least about 1.5 and preferably greater than 2.0. In one embodiment, the hub assembly includes at least a first hub member extending away from the optical storage medium. In this embodiment, the height of the first hub member over the adjacent medium surface is at least 0.25 mm. The first hub member can be used with a second hub member, preferably when both sides of the medium are being used. Alternatively, when only one side of the medium is being used for storing information, the first hub member might be used without a second hub member. When the optical storage medium and the hub assembly, or at least the first hub member, are located in a cartridge or other housing, the hub assembly, or at least the first hub member, acts to relieve any damage that the housing might be subjected to when a compressive force or pressure is applied thereto. Relatedly, in such a case, the hub assembly, or at least the first hub member, serves to substantially reduce the likelihood that the housing will unwantedly contact the optical storage medium, or otherwise contaminate it. Additionally, in regard to achieving a low profile, the hub assembly can include rounded or curved portions that facilitate engagement between a spindle shaft and the hub assembly. The spindle shaft is part of a drive or player of the optical system. Relatedly, when the spindle engages the hub assembly in the drive, the tip of the spindle shaft enters the hub assembly a reduced or lower distance, e.g., no greater than one-half the total height of the hub assembly, when a double-sided medium is employed. A profile savings also results when unloading the hub assembly, together with and the optical storage medium, from the spindle shaft since the space required to unload the hub assembly from the spindle shaft is reduced.

With respect to more specific features, the hub assembly can include a magnetic coupling or washer that is used in joining the hub assembly to the spindle of the optical drive. The magnetic coupling is made of metal and the remaining portions of the hub assembly are typically made of plastic. The magnetic coupling is advantageous in allowing repeated loading and unloading relative to the drive without detrimental effects. Because of their different thermal coefficients of expansion, the metallic coupling is uniquely joined to the plastic hub member of the hub assembly. That is, to avoid unwanted thermal strains that might be applied by the metallic coupling to the plastic, thereby potentially resulting in damage (e.g. cracking) to the plastic hub assembly, the coupling has limited contact or engagement with the first hub member. The thickness of the magnetic coupling is a function of the desired magnetic force to be achieved. The magnetic coupling is to be connected to the spindle of the optical medium. The attractive force to the spindle depends on the thickness of the magnetic coupling, with a greater thickness resulting in a relatively greater magnetic force. After joining the magnetic coupling to the hub member, the hub assembly can then be joined to the optical medium. In one embodiment, the hub member has at least a first adhesive injection port that passes through the hub member and communicates with a channel for receiving the adhesive. The channel is located between at least portions of the first hub member and a surface of the disk. The adhesive is used to fixedly join the disk or medium to the hub assembly.

In another embodiment, the hub assembly can include the first hub member and a second hub member disposed on opposing sides of the optical medium. The first hub member engages the second hub member such that the first hub member has a surface adjacent to and spaced a distance from (or offset from) an adjacent surface of the medium to prevent damage to the medium by the first hub member when the first hub member is engaged with the second hub member.

In still another hub assembly configuration, the second hub member includes a first ring projecting outwardly from a second ring having a larger diameter than the first ring. The first and second rings are concentrically disposed about a common center. The second ring is positioned in a central hole of the medium and the first ring is received in a central bore in the first hub member to hold the first hub member in position relative to the second hub member. Accordingly, the height of the first ring above the second ring is typically no more than the height (or depth) of the central bore in the first hub member. The telescopic connection involving the central bore receiving the first ring permits the hub assembly to have a very low profile. This allows for a low loading/ unloading profile for the hub assembly and the medium.

In conjunction with joining the hub assembly to the optical storage medium, it is important to eliminate, or at least substantially reduce, track runout or eccentricity. In accordance with one method to achieve this objective, a number of steps are employed. These steps include identifying for use at least a first portion of the medium that will be used for alignment purposes, i.e., properly positioning or joining of the hub assembly to the optical storage medium. The first portion is located inwardly of a peripheral edge of the medium and outwardly of a central hole in the medium. In a preferred embodiment, the first portion includes a track on the medium for storing data or other information. After at least such a first portion is identified for use, the determined position is obtained for the hub assembly. Once the determined position is obtained, the hub assembly can be positioned therein. Regarding the identifying for use step, in one embodiment, a light beam is directed against the medium and reflected light therefrom is processed to obtain the determined position. Based on this method, track runout can consistently be maintained to maximum tolerances of plus or minus 25 micrometers. As can be appreciated, conventional techniques, such as punching or molding, that determine the position of a hub based on the position of the central hole of the medium ignore the often substantial degree of eccentricity existing between the center of the hole in the medium and the positions of the radial data tracks, which typically vary from medium-to-medium. As can be further appreciated, these differences are particularly troublesome for double-sided mediums or disks that can have differently located points of track concentricity between the two sides. The method of the present invention permits the hub assembly for each medium to be centered based on actual track positions, which results in greater flexibility in compensating for manufacturing tolerances.

For double sided mediums in which the hub assembly includes first and second hub members, one located on opposing sides of the medium, the positions of the first and second hub members can be independently determined based on unique track positions located on opposing sides of the medium. Accordingly, the longitudinal center axes of the first and second hub members can be spatially offset (non-co-axial) from one another.

In an optical system, a combination comprising:

an optical medium for storing information and having a center; and a hub assembly positioned relative to said center, said hub assembly including at least a first hub member and at least a first coupling having substantial portions located outwardly of said first hub member, said first coupling having magnetic properties.

at least a majority by volume of said hub assembly is made of plastic and said first coupling is made of metal, said plastic having a first thermal coefficient of expansion and said metal having a second thermal coefficient of expansion, wherein said first coupling is disposed relative to said first hub member in order to accommodate a difference in said first and second thermal coefficients of expansion.

a spindle to which said optical medium and said hub assembly are removably connected and in which said spindle has a tip that extends into said hub assembly no greater than one-half of a total height of said hub assembly.

said first coupling is changeable in size in a radial direction due to temperature change while maintaining alignment with said first hub member.

In an optical system, a combination comprising:

an optical medium for storing information and having a thickness and a center; and a hub assembly positioned relative to said center and having a total height;

wherein a ratio between said total height of said hub assembly and said thickness of said optical medium is at least about 1.5.

said optical medium has a lead out track and a lead in track, said lead out track being at a lead out radius from said center of said optical medium and said lead in track being located at lead in radius from said center of said optical medium, said optical medium having a diameter and in which said diameter is no greater than about 40 mm, said thickness of said optical medium is no greater than about 0.6 mm, said lead out radius is no greater than about 6.5 mm and said lead in radius is no greater than about 16 mm.

said hub assembly has a center hole at said center thereof and also has first and second outer surfaces, with said first and second outer surfaces being located on opposite sides of said optical medium, wherein said total height of said hub assembly is defined between said first and second outer surfaces when said hub assembly is positioned relative to said center, and in which said center hole of said optical medium is substantially free of any portion of said hub assembly.

a spindle to which said optical medium and said hub assembly are removably connected and in which said spindle has a tip that extends into said hub assembly no greater than one-half of said total height of said hub assembly.

said hub assembly includes a first hub member and at least a first coupling having substantial portions located outwardly of said first hub member.

said first coupling has magnetic properties and includes at least a first tab, said first hub member has a peripheral edge and in which said first tab is positioned outwardly of portions of said peripheral edge of said first hub member.

said first hub member includes at least a first adhesive injection port for receiving adhesive to fixedly connect said first hub member to said optical medium.

said first hub member includes a channel that communicates with said first adhesive injection port.

at least a majority by volume of said hub assembly is made of plastic and said first coupling includes metal, said plastic having a first thermal coefficient of expansion and said metal having a second thermal coefficient of expansion, wherein said first coupling is disposed relative to said first hub member in order to accommodate a difference in said first and second thermal coefficients of expansion.

said first coupling is changeable in size in a radial direction due to temperature change while maintaining alignment with said first hub member.

said hub assembly includes at least a first hub member and said optical medium has an outer surface, said first hub member has a height above said outer surface that is no more than about 4 mm.

said optical medium includes at least a substrate and an information layer, and said first hub member is located more adjacent to said information layer than to said substrate.

said hub assembly has no portion located adjacent to and projecting outwardly from said substrate.

said optical medium has first and second outer surfaces and said hub assembly includes separate first and second hub members, said first hub member having a first longitudinal center axis and said second hub member having a second longitudinal center axis, said first hub member being located adjacent to said first outer surface and said second hub member being located adjacent to said second outer surface, and in which said first longitudinal center axis is offset from said second longitudinal center axis.

said hub assembly includes a first hub member and a coupling having substantial portions located outwardly of said first hub member and, when said hub assembly is joined to said optical medium, substantially all portions of said first hub member are located outwardly thereof.

said hub assembly includes a curved peripheral edge.

In an optical system, comprising a number of components including:

an optical medium for storing information and having a diameter, a thickness, a lead out track and a lead in track, said lead out track being at lead out radius from a center of said optical storage medium and said lead in track being located at a lead in radius from said center of said optical storage medium and outwardly of the lead in track, said diameter being no greater than about 40 mm, said thickness being no greater than about 0.6 mm, said lead out radius being no greater than about 6.5 mm and said lead in radius being no greater than about 16 mm.

a hub assembly fixedly connected to said optical medium and having a total height greater than said thickness of said optical medium.

said hub assembly includes at least a first hub member made substantially of plastic and a coupling made substantially of metal.

a spindle removably connected to said hub assembly and having a tip that extends no greater than one-half said total height of said hub assembly.

A hub assembly for connection to an information storage medium, comprising:

at least a first hub member being a majority by volume of plastic, said plastic having a first thermal coefficient of expansion; and at least a first coupling including metal having a second thermal coefficient of expansion;

wherein said first coupling is disposed relative to said first hub member in order to accommodate any change in size of said first hub member due to temperature change.

said first coupling is located outwardly of said first hub member.

said first hub member has a peripheral edge and said first coupling includes a tab that is bent adjacent to said peripheral edge.

a second hub member separate from said first hub member, wherein said first hub member has a longitudinal center axis and said second hub member has a second longitudinal axis and, when said first and second hub members are joined to opposing sides of said information storage medium, said second longitudinal center axis is offset from said first longitudinal center axis.

A method for mounting a hub assembly to an information storage medium, comprising:

identifying for use at least a first portion of said information storage medium, the first portion being located inwardly of a peripheral edge of the medium and outwardly of a center of the medium;

obtaining a determined position for said hub assembly based on said identifying for use step; and positioning said hub assembly in said determined position.

said first portion includes at least part of a track on said information storage medium.

said information storage medium has a central hole located at said center located at said center and said determined position is independent of the location of said central hole.

said identifying for use step includes contacting a peripheral edge of said information storage medium with a fixture.

contacting said information storage medium with a light beam;

directing reflected light from said information storage medium to a detector; and processing a signal from said detector to determine the location of at least said first portion.

According to another aspect, the hub assembly for a data storage disk comprises a hub member and a raised boss near a center axis of the hub member, the raised boss being surrounded by an annular bonding surface and being configured so as to protrude into a center hole of a data storage disk when the bonding surface is in contact with a surface of the disk.

According to yet another aspect, the invention includes a combination comprising a data storage disk and two hub assemblies having raised bosses. The hub assemblies are disposed on opposite sides of the disk, the respective raised bosses of the hub assemblies protrude into a center hole of the disk, where they are bonded to each other to increase the overall bonding force between the hub assemblies and the disk. The hub assemblies and disk may be bonded together using an ultraviolet (UV) curable adhesive.

As described above, the hub assembly may include a metal washer or hub plate that is used to magnetically clamp the disk/hub assembly to the spindle of a disk drive. In one embodiment, the metal hub plate has several tabs that are bent around the disk to attach the metal hub plate to the disk. The metal hub also has features, such as notches, that are used to register the metal plate correctly with a die that is used in the process of bending the metal tabs.

The hub member may comprise a material that transmits UV radiation, e.g., an optical grade plastic such as optical grade polycarbonate. In this embodiment, the hub member can act as a light pipe that transmits incident UV radiation to a UV curable adhesive at an interface between the hub assembly and a data storage disk or an interface with another hub assembly located on the opposite side of the disk.

The invention also includes a method of bonding a magnetic hub assembly to a data storage disk, the magnetic hub assembly comprising a UV-transmissive hub member and a metal hub plate. The method comprises applying a UV curable adhesive to a surface of at least one of the hub member and a data storage disk; positioning the magnetic hub assembly against the data storage disk; and directing UV radiation into the hub member through an exposed surface of the hub member. With this method the hub member acts as a light pipe in transmitting the UV radiation to the UV curable adhesive.

Additional embodiments, together with their associated features and advantages, can be readily determined from the following description, particularly when taken together with the accompanying drawings.

BRIEF DESCRIPTION OF THE DRAWINGS

FIG. 14 is an isometric top view of the hub assembly of FIG. 12;

FIG. 19 is a side view of the hub assembly of FIG. 17;

FIG. 20 is another side view of the hub assembly of FIG. 17;

FIG. 25 is a plan view of a magnetic coupling for use with the medium of FIG. 23;

FIG. 26 is a side view of the magnetic coupling of FIG. 25;

FIG. 27 is a cross-sectional view taken along line 27—27 of FIG. 23 with a pair of magnetic couplings engaging the medium;

FIG. 28 is a plan view of a hub assembly according to still yet another embodiment of the present invention;

FIG. 29 is a cross-sectional view of the hub assembly taken along line 29—29 of FIG. 28;

FIG. 30 is a cross-sectional view of the hub assembly taken along line 30—30 of FIG. 28;

FIG. 34 is a top view of the metal hub plate of FIG. 32;

FIG. 36 is a view of two hub members assembled on opposite sides of a data storage disk;

DETAILED DESCRIPTION OF THE INVENTION

Figure 1:
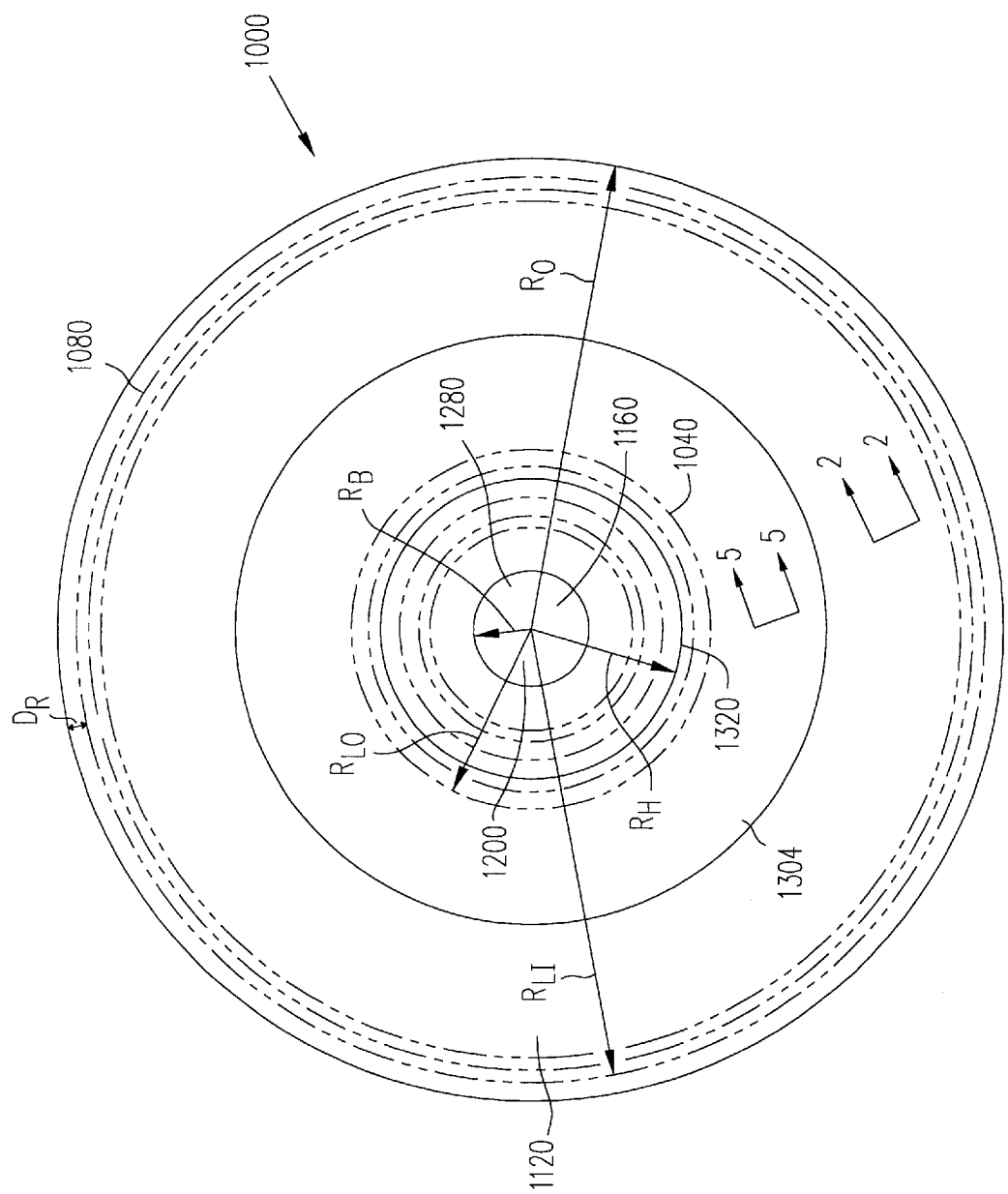
FIG. 1 is a plan view of an optical medium or disk according to an embodiment of the present invention.

Referring to FIG. 1, an optical medium according to a first embodiment of the invention is depicted. The medium 1000 includes: lead out and lead in tracks 1040 and 1080; a data field 1102 located in the region between the lead out and lead in tracks 1040 and 1080; and a central bore 1160, all radially disposed about a disk center 1200. In one configuration, the medium 1000 has an outer radius "$R_O$" ranging from about 14.5 to about 17.5 mm, and the central bore 1160 has a radius "$R_B$" ranging from about 1.5 to about 4.5 mm.

To maximize substantially the area of the data field, the lead in track 1080 is positioned close to the outer peripheral edge 1240 of the medium 1000, and the lead out track 1040 is positioned close to the edge 1280 of the central bore 1160. In one configuration, the radial distance "$D_R$" between the outer edge of the outermost lead in track 1080 and the outer peripheral edge 1240 of the medium 1000 ranges from about 0.5 to about 3 mm. In another configuration, the lead out radius "$R_{LO}$" ranges from about 6 to about 6.5 mm, and the lead in radius "$R_{LI}$" ranges from about 14.5 to about 16 mm.

The first and last tracks of the data field 1120 are positioned adjacent to the lead out and lead in tracks, or vice versa. In one configuration, the radial distance from the center 1200 to the first data track in the data field ranges from about 14 to about 16 mm, and the radial distance from the center 1200 to the last data track ranges from about 6 to about 7 mm.

A disk hub (not shown) can be positioned in the central bore 1160 to facilitate centering of the medium 1000 on a spindle shaft of a disk or optical drive (not shown). In one embodiment, a disk hub is positioned on one side of the medium 1000 having the operational surface when this is the only operational surface and, when there are two operational surfaces, a disk hub is positioned on both sides of the medium 1000, although a disk hub could be utilized on both sides even when there is only one operational surface. The circle 1320 located interiorly of the lead in track 1040 represents the location of the outer peripheral edge of the hub after engagement with the central bore 1160. The outer peripheral edge of the hub is therefore located, in the configuration shown in FIG. 1, at a radius "$R_H$" ranging from about 2.5 to about 5.5 mm and more preferably ranges from about 3 to about 4.5 mm. The distance from the outer peripheral edge of the hub to the inner edge of the innermost lead in track is sufficient for the optical head to read the information on the lead out track 1040.

As discussed in U.S. application Ser. No. 09/315,398, supra, the medium 1000 is typically enclosed by a cartridge housing (not shown) to protect the surfaces of the medium from damage and inhibit dust and other debris from collecting on the medium surface. The use of a cartridge housing is particularly important in first-surface optical media which are much more error sensitive to damage and foreign deposits on the medium surface than second-surface media.

The optical storage medium can have a small form which is highly desirable for disk drive miniaturization. In one configuration, the medium is usable in a disk or optical medium drive having a width less than about 52 mm, a thickness less than about 11 mm, and a depth less than about 45 mm.

The medium can, but need not, be formatted similar to conventional standards, such as the Compact Disc (CD) standard, the CD-R standard, the Compact Disc-Read Only Memory (CD-ROM) standard, the Compact Disc Interactive (CD-I) standard, the Compact Disc Write Once (CD-WO) standard, the DVD-Video standard, the DVD-ROM standard, the DVD-R standard, DVD-RAM standard and the DVD-Audio standard.

The track format, the track pitch and the linear density of the bits are selected as part of optimizing the optical disk system. Regarding the bit storage, it is advantageous that bits be stored using the shortest mark or indicia (light or dark) that can be detected (read). Such detection must also be reliable. Based on such criteria, the length of a data bit normally ranges from about 0.2 micrometer to about 20 micrometers, with a nominal length of such a mark or indicia being about 0.4 micrometer.

Focus and tracking control can be performed using any scheme that will be readily apparent to those of ordinary skill in the art. For example, servo control data or information can be molded or embedded. Radial tracking error signals can be derived using methods such as three spot in which a diffraction grating creates additional scanning spots or push pull in which a single scanning spot generates a diffraction pattern from a groove, molded pits or embossed pits. Focus error signals can be generated through methods such as Foucault knife-edge (which uses unequal distribution of illumination in a split beam), astigmatism (which uses a cylindrical lens to create spot asymmetry), or critical angle (which uses angle of incidence and a split beam) or beam/spot size.

As discussed in detail in U.S. patent application Ser. Nos. 09/393,899 and 09/393,150 both filed Sep. 10, 1999, and U.S. Provisional Application Serial No. 60/140,633 filed Jun. 23, 1999, supra, the data field can be divided into information content-mastered ("ICM") read only (prerecorded) and writeable (recordable) regions (write-once, and/or rewriteable regions), such as user-writeable regions. The optical medium can have a single structure or format (such as identical materials, layers and the like) for read only, write-once, and/or rewriteable regions. The mastered data or content can be commonly provided by an embossing process and/or by injection molding. The ICM region can include a table of contents or other indexing system for the mastered content, an indication of available writeable area, manufacturer information, type of content, information on how the disk can be used and/or how to obtain access to content, e.g., how to get the disk unlocked, so that, for example, the novice user can receive appropriate instructions. For example, some or all of the ICM data can be associated with a content key by which access to the ICM data is limited or restricted until such a key or code is written to the writeable area of the medium. Alternatively, the writeable regions can contain private user data including video and/or audio information and/or other types of data, such as annotations, supplements, updates, corrections, highlighting, reordering, remixing, collections, additions, bookmarks, cross references, hypertext or hyperlinks, comments, notes, and the like.

As discussed in U.S. patent application No. 09/393,150 filed Sep. 10, 1999, supra, one embodiment of the data storage medium includes at least first information content portions comprising a first portion storing parallel-written (e.g. embossed) first content (e.g. ICM) and a second portion storing second content (e.g. write-once or rewriteable content), different from the embossed or other typically simultaneously prerecorded content. The second content is typically recorded in grooves or on lands by means of marks and spaces formed in the grooves or lands. Since the reflectivity of the embossed information is different from the reflectivity of the information in the grooves, the second content can be discerned from the first content.

One embodiment of a first-surface optical medium configuration that is particularly suitable for PED's is shown in FIGS. 1–8. FIGS. 1–4 show the prerecorded information zone 1300 (FIG. 1) while FIGS. 1 and 5–8 show the recordable (writeable) zone 1304 (FIG. 1). Although FIG. 1 shows the prerecorded zone being closer to the lead in track and the recordable zone closer to the lead out track, the prerecorded and recordable zones can be located anywhere in the data field. The precise positions or sizes of the zones relative to one another and to the lead in and lead out tracks are discretionary.

Referring to FIGS. 1–4, the prerecorded information is embodied as a series of pitted regions 1301a–f and planar or unpitted regions 1302a–i. As will be appreciated, the pitted regions 1301 or planar regions 1302 could be replaced by raised or bumped regions to provide the desired contrast in the reflectivities of the adjacent regions 1301 and 1302. The pitted regions 1301 and the planar regions 1302 are typically configured in a spiral pattern on the medium surface.

Figure 2:
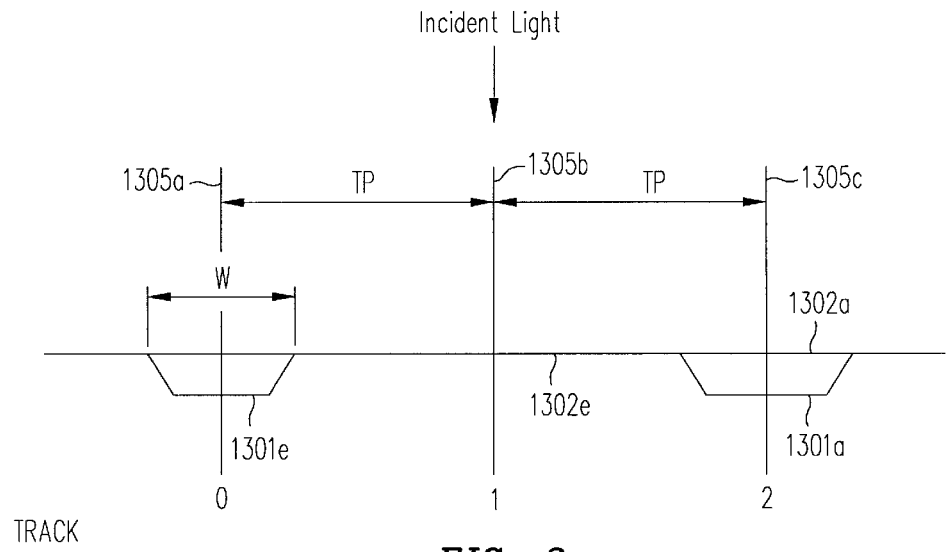
FIG. 2 is a cross-sectional view of the disk surface in a prerecorded information zone of the disk taken along line 2—2 of FIGS. 1 and 3.
Figure 3:
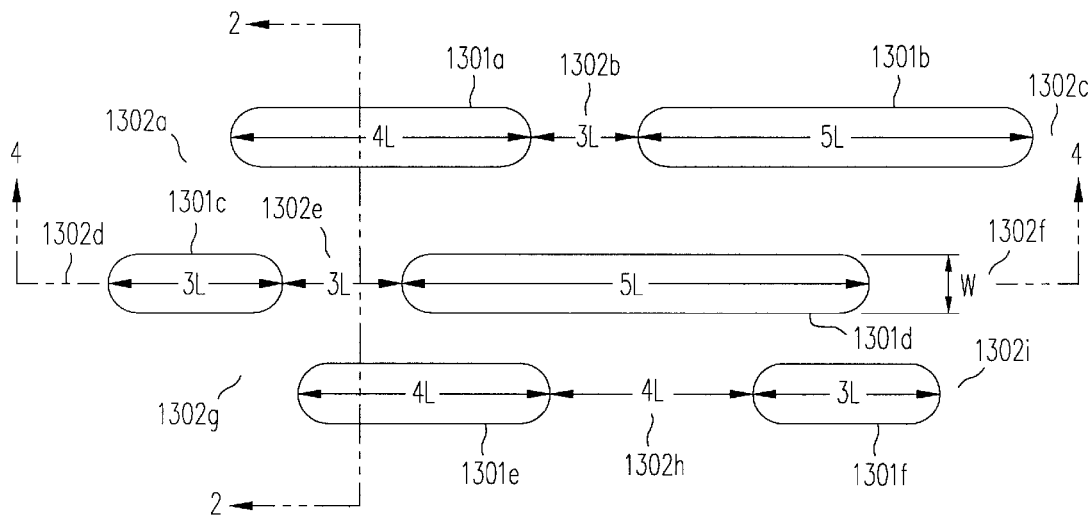
FIG. 3 is a plan view of prerecorded information in the prerecorded information zone.
Figure 4:
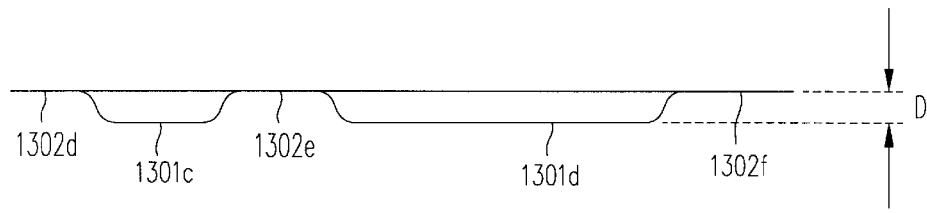
FIG. 4 is a cross-sectional view taken along line 4—4 of FIG. 3.
Figure 5:
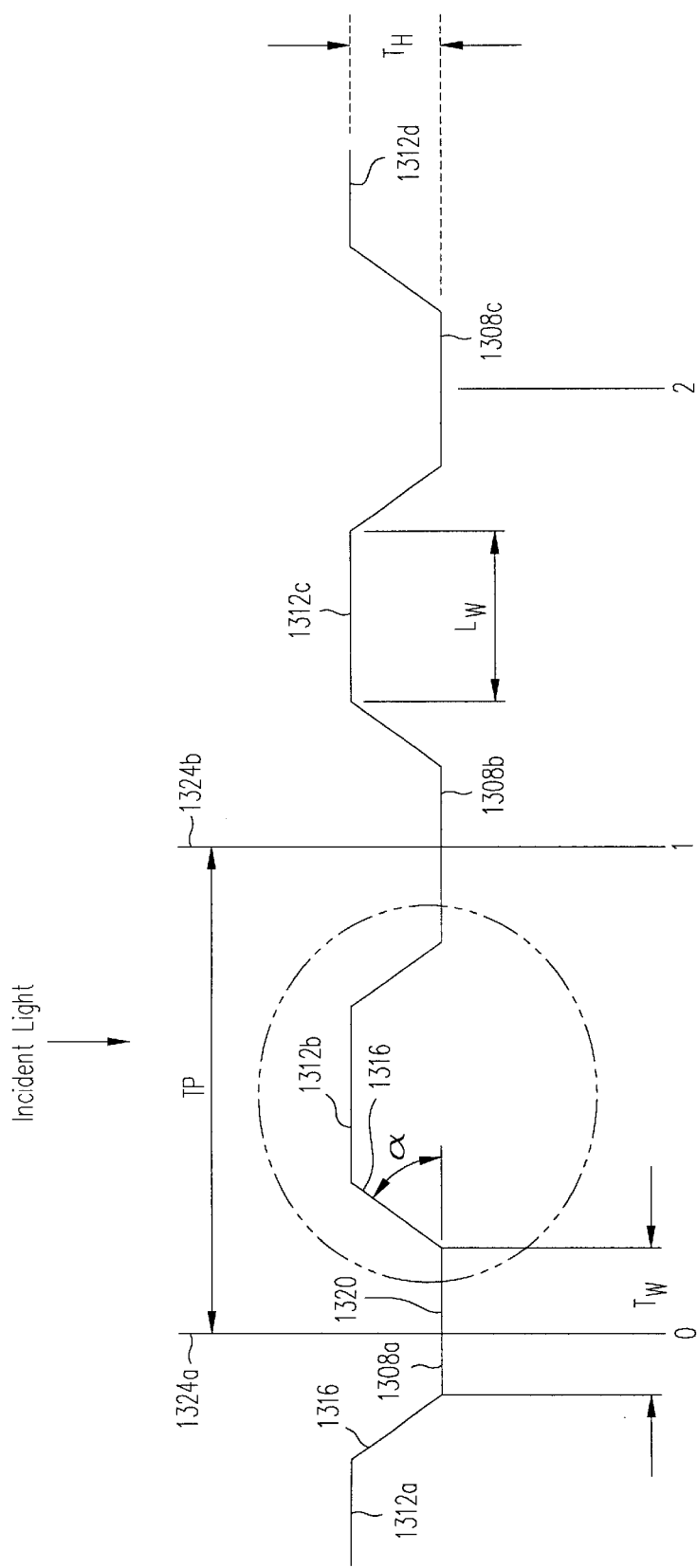
FIG. 5 is a cross-sectional view of the disk surface in a recordable zone of the disk taken along line 5—5 of FIGS. 1 and 7.

The dimensions of the features are discussed with reference to FIGS. 2–4. The distance "TP" between the center lines 1305a–c of the pitted regions of adjacent tracks 1 and 2 is typically about 740 nm and can typically range from about 370 to about 1110 nm. The respective widths "W" of the pitted and planar regions are generally the same and can typically range from about 50 to about 750 nm. The lengths of a pitted region 1301 or planar region 1302 are generally the same and can range from about 200 to about 300 nm. Each pitted region and each planar region length commonly is equal to nL, where n is an integer greater than 1. For example, pit 1361c has length "3L" and the planar or raised region 1302e has length "3L", while the elongated pit 1301d has length "5L". Usually, each pitted region and each planar region represents a number of binary bits. Referring to FIG. 4, the depth "D" of each pit typically ranges from about 5 to about 100 nm.

The pitted and planar regions 1301 and 1302 can be formed when the medium itself is formed using negative (pits) or positive (bumps) images of a master. It is possible, however, to form the regions after the medium is formed using suitable techniques.

The recordable zone 1304 is depicted in FIGS. 1 and 5–8. The recordable zone includes a plurality of alternating lands 1312a–d and grooves 1308a–c, which are shown as having the same width, although their widths could be different. The grooves 1308a–c are in the form of a trough, with inclined left and right sidewalls 1316 and flat bottoms 1320 relative to the groove bottom 1320 and can be arranged in a spiral pattern or another desired pattern. The left and right sidewalls 1316 are typically inclined at an angle α (alpha) ranging from about 30° to about 45° (measured relative to the groove bottom 1320). The height "$T_H$" of the sidewalls 1316 typically ranges from about 60 to about 100 nm. The distance "TP" of the adjacent center lines 1324a,b of the grooves 1308a and 1308b (i.e., tracks "0" and "1"), respectively, typically is about 740 nm and can be in the range from about 370 to about 1110 nm. The width "$L_W$" of the lands 1312 and the width "$T_W$" of the bottoms of the grooves 1308 are typically approximately the same, and the inclined left and right sidewalls 1316 are approximately the same length. As will be appreciated, however, "$L_W$" (width of the lands 1312) and "$T_W$" (width of the bottoms of the grooves 1308) can be different depending on the application. For example, the lands could be narrower than the groove bottoms to provide an even higher data density on the disk.

Figure 7:
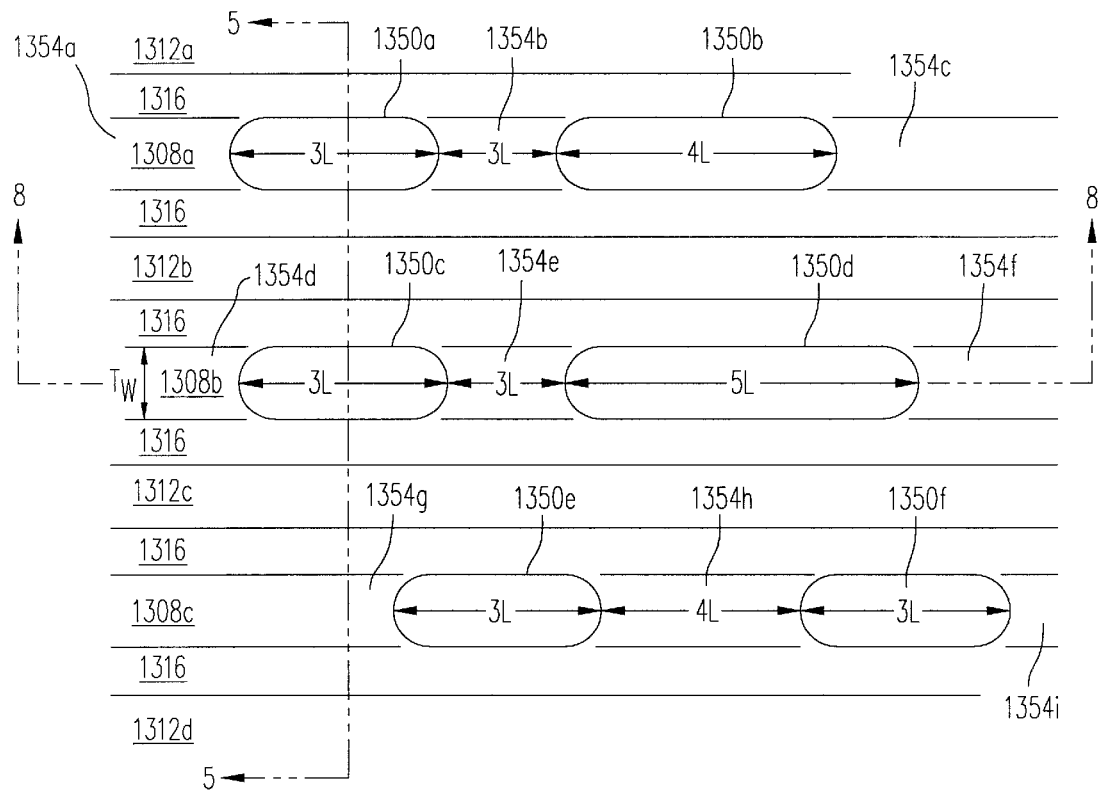
FIG. 7 is a plan view of recorded information in the recordable zone.
Figure 8:
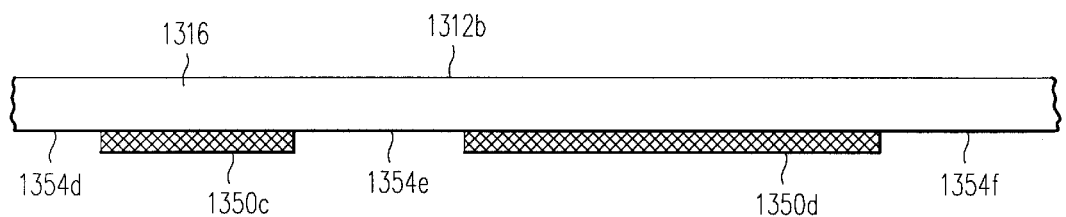
FIG. 8 is a cross-sectional view taken along line 8—8 of FIG. 7.

Information can be recorded either in the grooves 1308 or the lands 1312 or both. Typically, information is recorded in the grooves 1308 with the grooves 1308 and/or lands 1312 being used for servo control. As shown in FIGS. 7–8, information is represented in the grooves 1308a, 1308b by a series arrangement of marks 1350 and spaces 1354. As will be appreciated, information could also be represented by a series of pitted or raised (bumped) and planar or unraised (unbumped) regions as in the case of the prerecorded region. The widths of the marks 1350 and spaces 1354 are approximately the same as the widths of the groove bottoms "Tw". The minimum length "3L" of each of the marks 1350 and spaces 1354 is typically the same as the minimum length "3L" of each of the pitted regions 1301 and unpitted regions 1302. The width of the groove bottoms "$T_W$" in the recordable region can be the same as the width of the pitted region bottoms in the prerecorded region.

With respect to distinguishing information associated with the grooves 1308a, 1308b from the information in the prerecorded region, namely, the pitted and unpitted regions 1301, 1302, reliance can be placed on their reflectivity difference. Regardless of where a transition from the prerecorded region to the recordable region might be on the medium, the reflectivity associated with the marks 1350 and the spaces 1354 in the grooves 1308 sufficiently distinguishes them from pits or bumps in the prerecorded region.

As discussed in U.S. patent application Ser. No. 09/315, 398, supra, the bits can be mastered or recorded using a variety of read only, write-once, or rewriteable optical media. Examples of suitable media are described in U.S. Pat. Nos. 4,960,680 and 5,271,978, which are incorporated herein by this reference. Another example of a medium that can be used in embodiments of the present invention is that described in U.S. Pat. No. 4,816,841 of Kurary Plasmon Data Systems Co., Ltd., which is an example of a medium with a plastic substrate. Non-rigid media may, in some embodiments, be adhered to (or otherwise coupled to) one or both surfaces of a rigid substrate to provide a rigid, compound medium, or may be coupled to a semi-rigid substrate (to provide a semi-rigid, compound medium) or left uncoupled to a substrate to provide a non-rigid medium.

Figure 9:
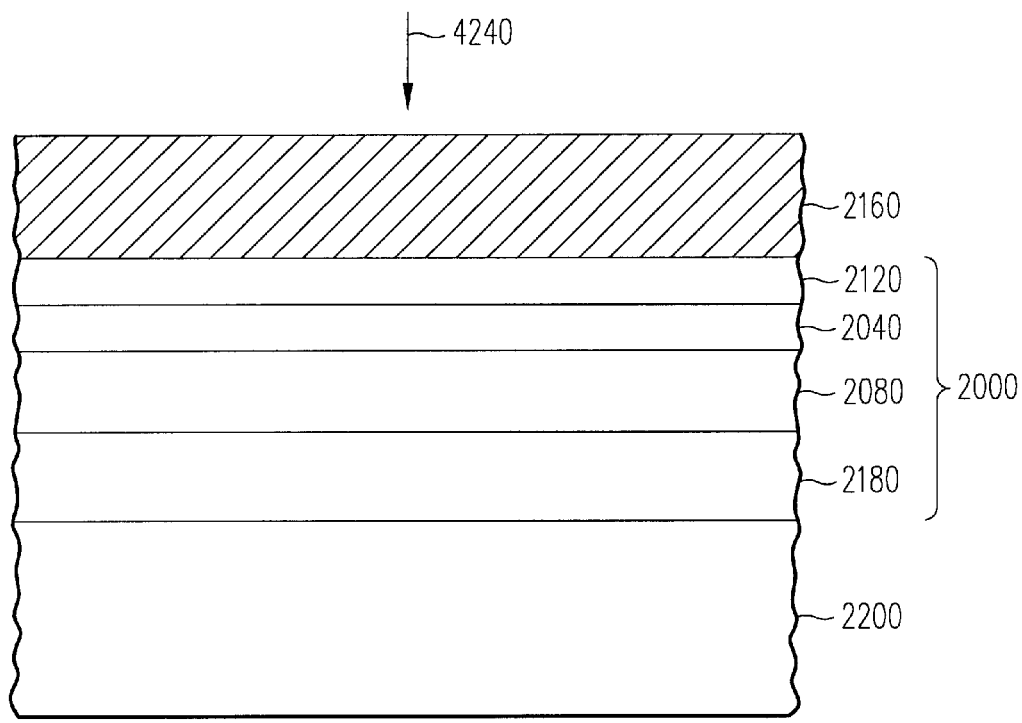
FIG. 9 is a cross-sectional view of an optical medium according to another embodiment of the present invention.

In one embodiment shown in FIG. 9, a second-surface media configuration of the type described above is depicted.

This medium includes a composite information layer 2000 that includes a recordable dye or phase change film 2040, that is adjacent to a dielectric film 2080, coupled by an adhesion film 2120 to one side of a transparent layer 2160. A thick reflective film 2180 is coupled to a lower polymer layer 2200.

Figure 10:
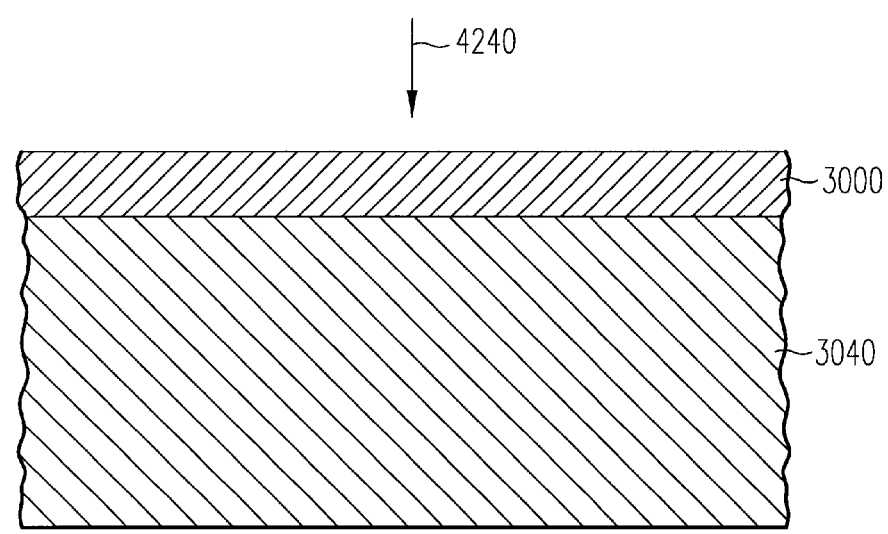
FIG. 10 is a cross-sectional view of an optical medium according to still another embodiment of the present invention.

In a further embodiment, FIG. 10 depicts a first-surface medium having a single information layer 3000 that constitutes the information content portions located on a substrate 3040. The information layer 3000 is deposited directly on the substrate 3040, and there need be no other films or layers, if it is sufficiently chemically resistant to be exposed to air and moisture. A thin coating of a wear-resistant material could be deposited on the exterior surface of the layer 3000. The material composition, substrate and deposition parameters may be chosen for optimal adhesion and layer quality. Thickness may be optimized to make use of optical interference between the incident surface and the film/substrate boundary to improve coupling of the write beam (improve sensitivity) and/or enhance the reflectivity contrast in readout.

Figure 6:
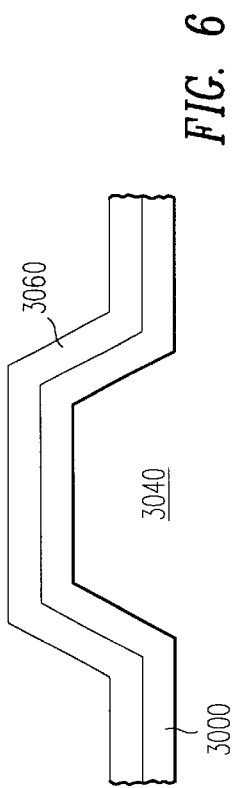
FIG. 6 is an exploded view of a section of the disk surface depicted in FIG. 5.

In yet another embodiment, FIG. 6 depicts a land of a first-surface medium having an information layer 3000 located above a substrate 3040 with a protective layer 3060 being located above the information layer 3000. The information layer 3000 typically has a thickness ranging from about 60 to about 100 nm and is preferably electrically conductive. The protective layer 3060 typically has a thickness ranging from about 25 to about 150 nm.

The protective layer 3060 is preferably a transparent, low loss dielectric to permit radiation to contact and be reflected by the information layer 3000. The protective layer 3060 can alternatively be conductive to prevent the build up of an electric charge beneath the protective layer 3060 so that charged particles of dust, etc., do not electrostatically adhere to the surface thereof. The protective layer 3060 is wear resistant to protect the information layer 3000 and is heat resistant to resist heat generated during the read and/or write operation. Additionally, the protective layer 3060 does not interfere with the passivation property (non-corrosion attribute) of the information layer below it. Transparent inorganic materials such as silicon oxide, SiN, GeN, $ZnS:SiO_2$, and $SiO_xN_y$ are preferred. A particularly preferred transparent material is silicon oxide, $SiO_x$, with x between, and including, 1 and 2 (e.g. SiO-silicon monoxide, $SiO_2$-glass). The $SiO_x$ having a higher available oxygen content than SiO can be sputtered on as an overcoat and will not interfere with the passivation property of the information layer 3000.

In yet another embodiment, first-surface media are provided in the form of monolithic substrates or structures which contain the information. In other words, the substrate has no discrete information layer deposited on the substrate surface. This first-surface medium is particularly useful for ICM or prerecorded information. Such a monolithic substrate can be injection molded, embossed or might be formed from a material with write-once capability.

Figure 11:
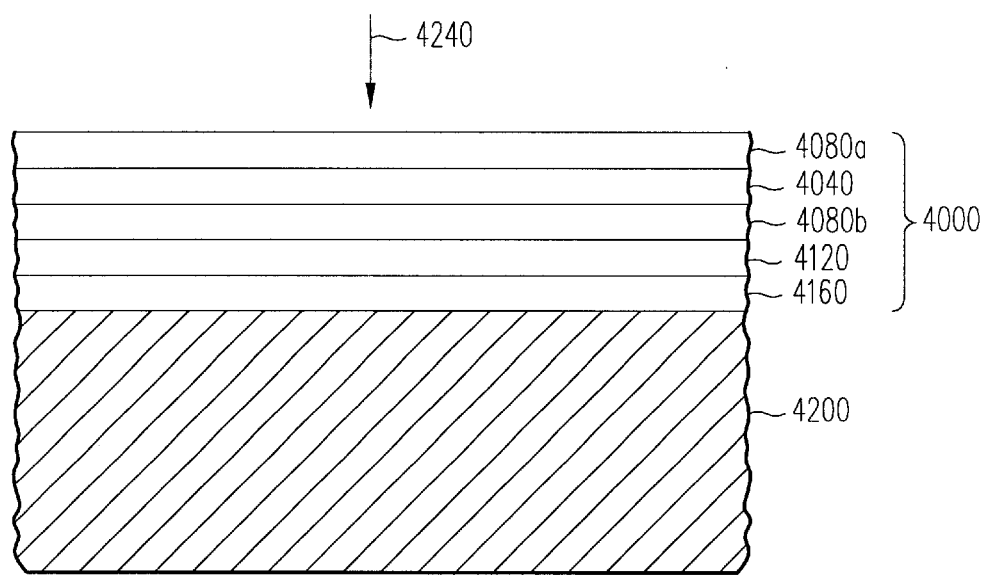
FIG. 11 is a cross-sectional view of an optical medium according to yet another embodiment of the present invention.
Figure 13:
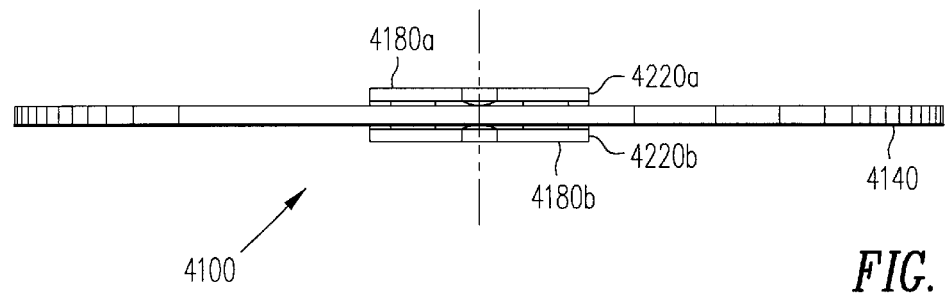
FIG. 13 is a side view of the medium and hub assembly of FIG. 12.
Figure 12:
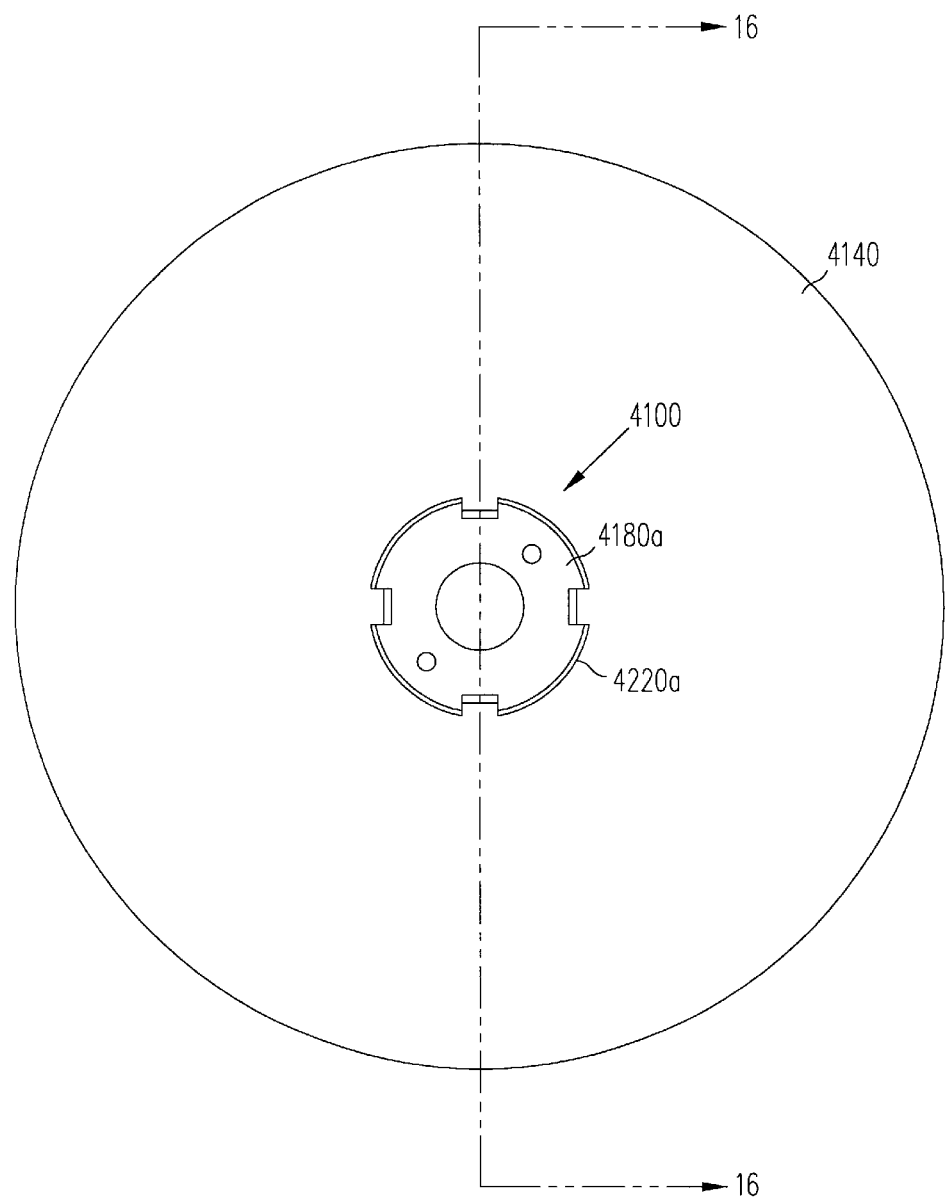
FIG. 12 is a plan view of a medium having a hub assembly.
Figure 15:
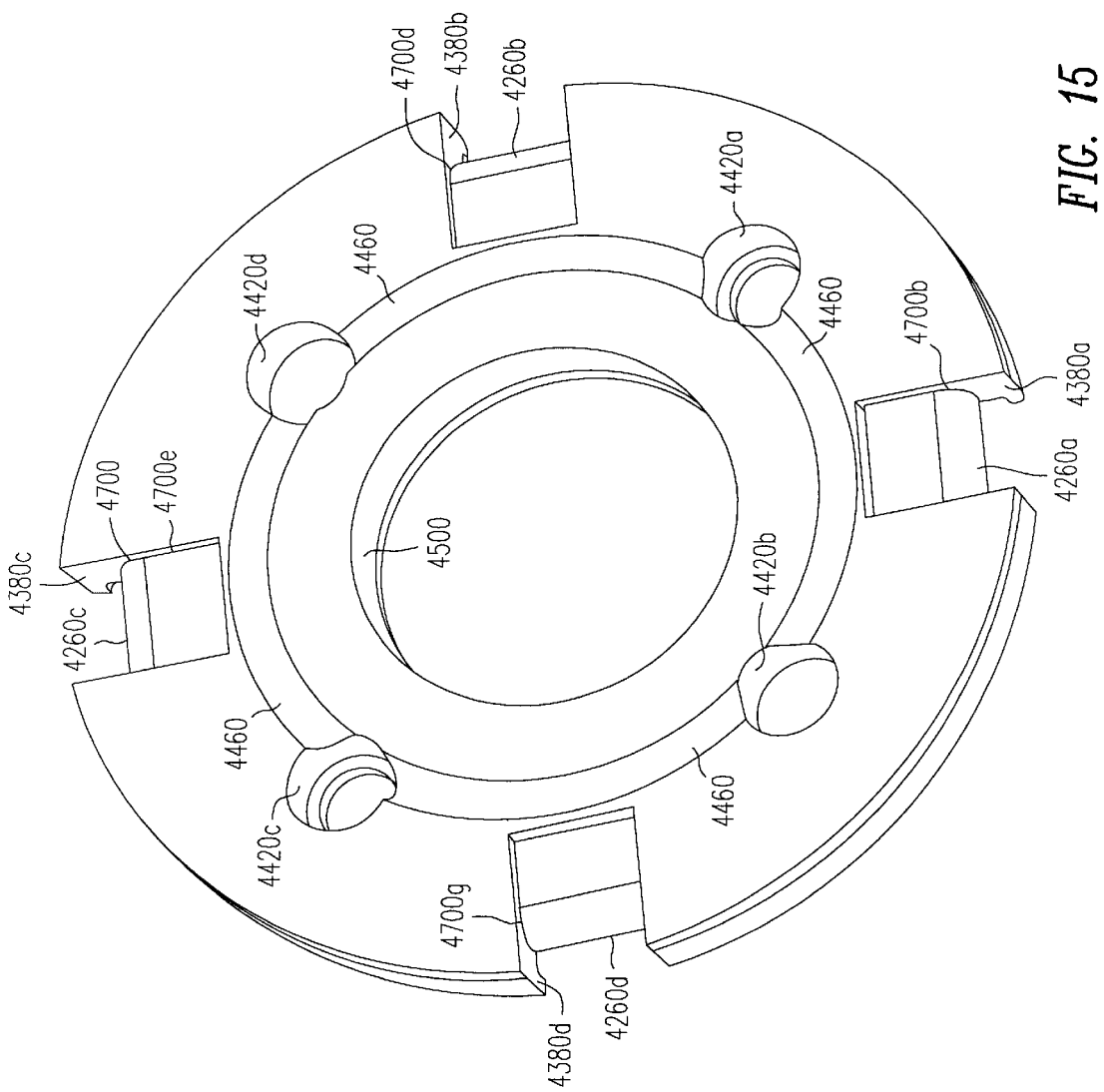
FIG. 15 is an isometric bottom view of the hub assembly of FIG. 12.

In yet another embodiment, FIG. 11 depicts a more complex configuration for first-surface media. In the illustration of FIG. 11, a multi-film information layer 4000 includes a recordable dye or phase change film 4040 sandwiched between two dielectric films 4080*a*, 4080*b*. A reflective film 4120, adjacent the sandwich 4080*a*, 4040, 4080*b*, is coupled by an adhesion film 4160 to a substrate 4200. In the illustration of FIG. 11, the upper surface of the upper dielectric film 4080*a* defines the operational surface of the recording layer 4000, that surface which is initially struck by the read/write beam 4240. The read-write beam 4240 traverses film 4080*a* of the multi-layer film, composite information layer 4000 before reaching the recordable dye or phase change film 4040. In other embodiments, the beam may traverse two or more films before reaching the information film 4040. Preferably, films which are traversed before reaching the information film 4040 are sufficiently thin, such as equal to less than about 5, more preferably no more than about 1, and most preferably no more than about ½ wavelength (e.g. less than 100 nm, preferably less than about 50 nm, for 635–675 nm light).

The thicknesses of the various layers 4080*a*, 4040, 4080*b*, 4120, and 4160 are selected depending on a number of factors such as absorptivity, index of refraction, thermal properties and the like. In one embodiment, the medium is an InSbSn phase change medium. Preferably, the various layers 4080*a*, 4040, 4080*b*, 4120, and 4160 in the composite information layer 4000 are each relatively thin, such as less than about 120 nm each, preferably ranging from about 60 to about 80 nm. The information layer 4000 is less than about 1000 nm thick, preferably less than about 400 nm, and may be as thin as about 20 nm or less.

Since, as described above, the effect of disk tilt (deviation from perpendicularity relative to the light beam) depends on the second surface substrate thickness, a first-surface medium can significantly reduce the effect of these errors. The dielectric film 4080*a* is sufficiently thin that there is little effect on beam focus.

The information layer or film in the above embodiments can be formed of any number of materials, preferably those that are thermally-written and optically-read and may be write-once, such as a phase-change material, (such as TeO or a metal alloy, e.g., InSbSn) or a dye (for example a cyanine or pthalocyanine dye) or it may be rewriteable, such as other state or phase change materials (GeTeSb) or magneto-optic materials. In the case of read-only media or portions thereof, instead of thermally-written, the information is typically injection molded. In at least one embodiment, the information medium film 4040 is substantially electrically conductive, so that static charges will tend to be dissipated, rather than contributing to undesirable build-up of dust particles or other debris.

The substrate can be composed of any suitable rigid or semi-rigid material. The substrate may be plastic, either transparent or absorbing, such as polycarbonate or PMMA, or may be glass or optical crystal, metal, fiberglass or other material. Polycarbonate is preferred because of its dimensional stability, accurate reproduction of the mold surface, minimum water absorption, good impact resistance, easy processing characteristics, and freedom from impurities. The substrate thickness typically is in the range of about 300 to about 1200 μm.

A feature of first-surface media is that the optical properties of the substrate are much more relaxed. In general, any transparent or light reflective substrate may be used, except where the medium is monolithic which requires that it be reflective. The substrate may be planar (for soft-formatting) or embossed with information, such as associated with DVDs and CD's. Thickness need only be sufficient to maintain mechanical tolerances such as warp.

If desired, a thin coating (such as a few molecules thick) of carbon or other wear-resistant material (not shown) can be deposited on the exterior surface of the film 3000, 4080*a*.

The dielectric films 4080*a,b*, if present, can be formed from a number of materials, including co-deposited ZnS- :SiO$_2$. A dielectric film may be added on one or both sides of the information film 4040. In the case of a top film 4080a (i.e. between recording film and air) it can provide chemical and moisture protection, as well as hardness for scratch resistance. Also it can provide thermal insulation in order to reduce conductive cooling from the recording film in a spinning disk which would otherwise reduce sensitivity. A top film can also provide an optical anti-reflection function by choosing the film's refractive index and thickness. Additionally, the dimensions (e.g. thickness) of the dielectric film(s) can be "tuned" to optimize desired reflectivity and contrast.

In a structure with dielectric films, a metallic reflective film 4120 may be added. This is particularly advantageous with dye media, since it is predominantly only the absorption of the media that is changed, and the reflection signal can be enhanced by using a reflector film and a double pass of the beam. The reflective film(s) 4120 can be formed from a number of materials, such as aluminum or other metals. Metallic reflection films are generally good thermal conductors, and may be used in part to control heat flow. This is particularly useful with at least certain rewriteable media where rapid cooling rates are desired for writing bits. Note that with first-surface media recording, the substrate itself may be metallic and may act as a reflector.

The adhesion films(s) 4160 may be provided between films or layers which would have poor adhesion if placed in direct contact. An adhesion film 4160 between the information layer and substrate provides for potentially improved adhesion to the substrate, as well as modifying the properties of the recording film when it is deposited, such as the film's crystal size in the case of a phase-change medium, which can lead to improved sensitivity and recording uniformity. In addition, the adhesion film can provide optical advantages, such as modifying the readout contrast. In addition, it can be part of the thermal optimization. For example, for at least certain rewriteable media, it is desirable to control the rate of heat flow to the substrate or other layers. The adhesion film(s) may be as thin as 0.2–0.5 nanometers.

With regard to the location or locations on an optical medium of writeable (write-once, and/or rewriteable) portions, they may encompass the entire surface of the disk or they may be found on only parts thereof. The material(s) or composition(s) of the coating(s) or thin films(s) associated with the writeable portions can be different from those portions that are read-only or are prerecorded areas of the medium, as discussed in U.S. Patent Application Serial No. 60/140,633. However, it is preferred that the composition or material makeup of the coating(s) or thin films(s) be the same over all portions of the disk. In the case of writeable portions, the coating(s) or thin films(s) itself has the information content portions. In the case of read-only portions, the coating(s) or thin film(s) enhances the read signal associated with such read-only portions.

As will be appreciated by those of ordinary skill in the art, there are many techniques that can be used to form and replicate a master disk to yield the medium of the present invention. In one mastering technique, a master disk can be formed using photoresist mastering techniques. According to this technique, a first laser is used to expose photoresist areas on a master glass disk with the thickness of the photoresist determining the depth of the features or indicia. A second laser is used for focus and tracking. The glass master disk is next developed by an automatic developing machine. The marked areas are etched away by a developing fluid that creates pits, grooves or other indicia in the resist surface. Pit depth is monitored and etching is stopped when the glass surface has been reached. Following development, a metal coating is evaporated onto the photoresist layer and a master disk is created by electroforming.

Other mastering techniques for developing a master disk include: the DRAW mastering system in which a non-photoresist (NPR) recording medium and direct-read afterwrite (DRAW) technology are used; and the direct metal mastering (DMM) technique in which the pits are embossed directly on a metal master disc via a piezoelectric electro-mechanical transducer having an embossing diamond stylus.

Regardless of the technique to create it, the master disk is then replicated to form stampers. The stampers may contain negative or positive images of the mastered information, grooves, servo control information, test areas, and other features in user writeable areas. The stampers are placed in injection mold cavities in connection with forming plastic replicas or substrates.

In separate processes, the various layers are then deposited on the substrate using known techniques such as sputtering, vapor deposition, spin coating, and electrodeposition.

As discussed in U.S. Patent Application Serial No. 60/140,633, supra, the same molding procedure which provides the mastered content is also used to provide formatting, sector, focus, tracking and/or test areas in the (otherwise) writeable region of the medium. In another embodiment, additional steps are provided following the molding procedure such as coating with a preferably thin (e.g., less than 100 nm) protective and/or reflective material (which may be found in one or both of writeable and read-only (or ICM-data containing) regions).

Referring to FIGS. 12–16, the medium 4140 is joined to a separate hub assembly 4100. The hub assembly performs several advantageous functions. First, the hub assembly 4100 radially aligns the tracks of the medium with the center of the spindle of the drive to minimize eccentricity and runout. The hub assembly and spindle also cooperate to provide, on a repeatable basis; a high degree of vertical alignment. In that regard, a reference plane is definable by a surface in the optical drive which is utilized to ensure that the medium is vertically aligned relative to this reference plane and that the medium is within acceptable planarity tolerances. The hub assembly can be made of and/or include a material that is magnetically attractive to permit a magnet engaged with or incorporated into the disk drive to magnetically chuck (or self-locate) the hub assembly and accompanying medium relative to the spindle and to provide driving torque for the disk drive. The magnetic field strength is between that strength necessary to inhibit slippage of the medium on the drive and provide torque and that strength which may warp the medium or create difficulty in removal of the medium from the drive. The hub assembly can engage (or provide structural support to) a portion of the cartridge housing (not shown) to resist accidental compression of the housing walls by for example a user and consequent damage of the medium by contact with the walls. The hub assembly can further include features, such as chamfered or curved surfaces, to facilitate centering of the hub assembly on the drive spindle in connection with guiding and locating the medium on the drive during loading of the medium. Finally, the hub assembly can provide a seal between the central opening of a cartridge (not shown) and the medium, e.g., to avoid contamination of the data-bearing portions of the medium by foreign matter such as dust.

In this embodiment, the hub assembly 4100 includes one or more washers or couplings 4180 that are preferably made of a metallic, magnetic material, or made of plastic with impregnated metallic material. The magnetic coupling 4180 is beneficial in accomplishing loading and unloading of the hub assembly 4100 and the optical medium relative to the spindle shaft of the optical drive without detrimental or excessive wear. The magnetic coupling 4180 is attracted by the optical drive magnet(s) joining the hub assembly 4100 and the optical medium to the spindle shaft. In that regard, when the spindle shaft is inserted into the hub assembly 4100, a space remains between the optical drive magnet(s) and the magnetic coupling 4180. Because of this spacing, it is important that the magnetic coupling 4180 be designed to achieve sufficient force in order to suitably interconnect the spindle shaft and the hub assembly 4100 by means of the magnetic coupling 4180. The magnetic coupling 4180 should be made of a material and/or have a thickness to provide the desirable force for given optical drive magnet(s).

Since portions of the hub assembly 4100, other than the magnetic coupling 4180 are typically made of plastic, certain design considerations or factors must be taken into account in order to avoid unwanted fracturing or cracking of the plastic portions of the hub assembly 4100. In particular, the hub assembly 4100 can include first and second hub members 4220*a*, 4220*b*. Each of these two members is typically made of plastic. Each magnetic washer 4180, on the other hand, is metallic. Each magnetic washer 4180 has a different thermal coefficient of expansion than each plastic hub member 4220. If substantial portions, or at least certain portions, of the magnetic washer 4180 are constrained relative to the plastic hub member 4220, the magnetic washer 4180, has the potential of creating strains that can fracture, distort or otherwise damage the plastic hub member 4220 or optical medium. According to one embodiment, any expansion or contraction of the plastic hub member 4220 and the magnetic washer 4180 relative to each other does not result in an unwanted compressive force being applied to the plastic hub member 4220 by the metallic washer 4180. Tabs 4260*a*–4260*d*, including their placement, accommodate any expansion or contraction of these two parts relative to each other. Relatedly, the contact area of the tabs 4260*a*–*d*, constituting the regions or areas of any contact or engagement with the hub member 4220, is significantly less than the remaining areas or portions of the washer 4180 that are not in constraining contact or engagement. Consequently, the differences in their thermal coefficients of expansion has minimal, if any, impact.

For two hub members 4220*a,b*, each of them can be separately joined to its respective washer 4180*a,b*. This separate attachment can avoid unwanted misalignment when the center of a first combination of a hub member and a washer is not perfectly aligned with the center of a second combination. Consequently, when each combination of a hub member and a washer are joined to opposing sides of the optical medium, they can be separately aligned therewith.

Returning to FIGS. 12–16, further descriptions of this embodiment are provided. The hub assembly 4100 is adhered to the medium or disk 4140 by an adhesive or molding (not shown). First and second hub members 4220*a*, 4220*b* of the hub assembly 4100 are joined to opposing surfaces of the disk 4140. The central hole of the disk is substantially free of any portion of the hub assembly 4100. The hub assembly 4100 includes the magnetic washers or couplings 4180*a*, 4180*b* mounted on and located outwardly of each of the hub members 4220*a,b* (which typically have the same chemical composition as the medium or medium substrate). Each magnetic coupling 4180*a,b* can be a magnet itself (in which case a magnetically attracted material would be disposed in the annular channel of the disk drive) or a material that is attracted to a magnet, such as mild-steel. Each of the couplings 4180*a,b* includes the plurality of outwardly extending tabs 4260*a*–*d*, a central bore 4300 to receive a disk drive spindle shaft (not shown), and one or more adhesive injection ports 4340*a,b*. Each hub member 4220 includes a plurality of slots 4380*a*–*d* for receiving the extending tabs 4260*a*–*d*, one or more adhesive injection ports 4420*a*–*d*, and a channel 4460 that communicates with the various injection ports to provide a passage for injection of the adhesive and bonding of the hub member to the disk, and a central bore 4500. As in the previous embodiments, the hub member includes a chamfered or rounded surface 4800 surrounding the hub member to facilitate placement of the disk in the disk drive (not shown).

The coupling 4180 is received in an indented or concave surface of the hub member defined by raised walls 4540*a*–*d* having the same shape as the peripheral edge of the coupling 4180 (excepting the tabs). The walls 4540*a*–*d* and slots 4380*a*–*d* together facilitate alignment (or self-location) of the coupling 4180 relative to the hub member.

After alignment of the magnetic coupling on the hub member (e.g., alignment of the tabs with the corresponding slot), the various tabs 4260*a*–*d* are bent or crimped into the slots using a crimping tool to form a line-to-line or interference fit between the tab and slot. A space "S" (which typically ranges from about 0.01 to about 0.10 mm) is located between the free end of each tab and the adjacent surface of the hub member to prevent thermal expansion interference of the hub member with the tab during the crimping. To avoid contact of the tab and the disk surface 4140 and possible damage to the disk and/or interference with the engagement of the hub member with the disk, the exterior surface 4600*a*–*d* of each tab 4260*a*–*d* is spaced from the disk surface 4140.

The lateral clearance between the sides 4700*a*–*h* of the tabs 4260*a*–*d* and the adjacent sidewalls of the slots 4380*a*–*d* is relatively small to substantially minimize, or eliminate, slippage of the magnetic coupling relative to the hub member 4180. In one configuration, the width of each tab is about 1 mm, and the interference fit is such that, even at high temperatures, there is insufficient stresses created so that no cracking of material occurs.

The hub member and attached magnetic coupling can then be aligned with the data tracks, peripheral edge, or central bore of the medium and thereafter adhered to the surface of the medium. In one embodiment, the hub member 4180 may include four adhesive injection ports located along quadrant lines of the hub member so that regardless of how the magnetic coupling is aligned with the hub member, the adhesive injection ports 4340*a,b* in the magnetic coupling will align with two of the adhesive injection ports 4420*a*–*d* in the hub member. After positioning of the hub member on the disk, an adhesive is injected through the port(s) and into the channel which surrounds the central bore 4500. Because the magnetic coupling and hub member may block radiation from contacting the adhesive, an adhesive that does not require an ultraviolet cure may be used.

Figure 16:
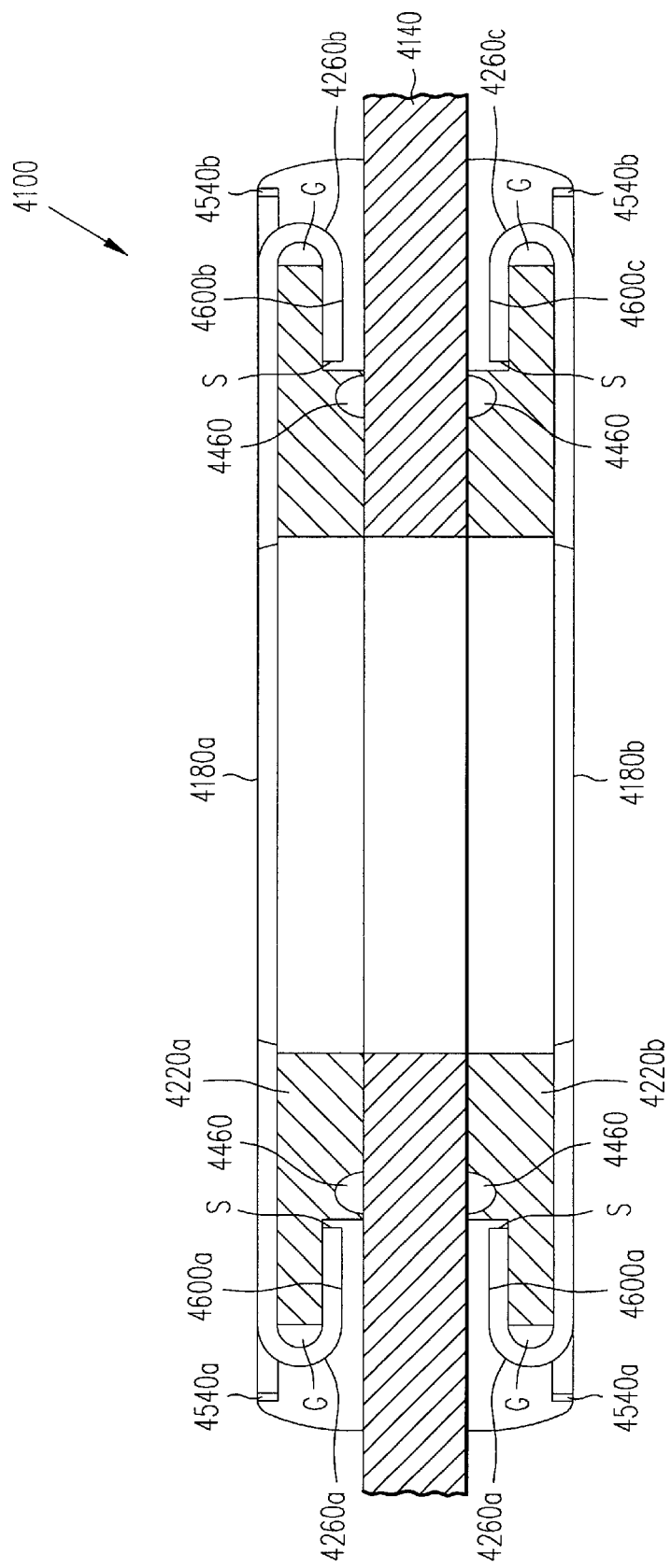
FIG. 16 is a cross-sectional view taken along line 16—16 of FIG. 12.

Referring to FIG. 16, a gap "G" (which typically ranges from about 0.01 to about 0.25 mm) is located between the end of each slot 4380*a*–*d* and the adjacent, interior surface of the bent tab 4260*a*–*d*. The gap provides room for radial expansion and/or contraction of the hub member and/or bent tab in response to temperature changes and accommodates differences in the thermal coefficients of expansion for the metal washer 4180 and the plastic hub member.

The spindle is received in the central bores of the washers 4180 on each surface. Alignment of the medium in the disk drive by the spindle is therefore not typically done relative to the central bore of the medium, which can be misaligned relative to the data tracks.

In another embodiment, a method is provided for aligning the hub assembly relative to the data tracks and/or peripheral edge of the disk and at least substantially independent of the position of the central bore of the disk. This method is particularly useful for the hub assembly of FIGS. 12–16. In the method, a desired portion of the medium is located, a selected position for the hub member is determined based on the location (e.g., the radius of curvature) of the desired portion to provide a high degree of concentricity between the hub member center and the data tracks. The hub member is thereafter positioned in the selected position. For double-sided disks, these steps are repeated for a separate hub member to be positioned on each side of the disk.

The desired portion of the medium typically is or includes an optically recognizable feature and is located outwardly of the central hole of the disk (and the determined hub member position) but inwardly of the peripheral edge of the disk. The recognizable feature includes physical markings in the disk surface, such as one or more data tracks (either a land or groove) and/or focus control features.

In one configuration, the position(s) for the hub member (s) are determined based on the radius of curvature of the desired portion of the disk (i.e., a selected length of a selected land or groove). The center(s) of the hub member(s) are located at the approximate center of the radius of curvature.

In another configuration, one or more additional portions of the disk that relates to the desired portion of the disk are located. The hub member(s) center(s) are then positioned based on the approximate center point relative to the desired portion and the one or more additional portions. For example, three portions (120° apart) of a selected track can be located with the center point among the three portions being assumed to be the center of the radius of curvature for the track. For spiral tracks, information related to the transition between grooved and ungrooved patterns can be utilized to achieve proper alignment.

In one process configuration, the medium is contacted with a light beam such as from a laser, the light beam is traversed over a length of the medium, the reflected light is directed to and received by a detector such as quadrature detector, and the signal(s) from the detector are processed to locate one or more of the data tracks. The system can include components and employ track location techniques similar to those used for servo control generally and/or other types of components and optical techniques depending upon the application.

During the performance of the preceding steps, a mechanical fixture is contacted with a peripheral edge of the disk to hold the disk substantially stationary against a flat underlying surface. Accordingly, the mechanical fixture either moves to engage the peripheral edge or is substantially immovable with a very close tolerance to the peripheral edge of the disk. The fixture typically contacts the peripheral edge of the disk at a plurality of points, typically in differing quadrants of the disk. The fixture can include one or more clamping arms to force the disk flat against the underlying surface to provide more accurate hub member positioning. Alternatively, the fixture can be a flat suction or vacuum surface using negative pressure to clamp the disk firmly in position.

In either of these process configurations, the positioning of the hub members on the disk are independent of the precise location of the central bore of the disk. The method can work equally well on disks not having a central bore.

The method is highly advantageous. It provides for precise centering of the hub member (and hub bore) relative to the data tracks. It also permits the two hub members to be positioned on opposing sides of the disk independently of one another. This ability permits the sometimes differing concentricities of the radial tracks on the two surfaces to be considered. This process represents a significant departure from conventional processes in which the hub is centered based entirely on the position of the central bore of the disk. The process is equally useful for magnetic, magneto-optical, and optical media.

Referring to FIGS. 17–20 another embodiment of a separate hub assembly 5040 is depicted. The hub assembly 5040 has a first member 5120 and a second member 5080 which can be engaged or joined together by any suitable technique such as interference or snap fit, an adhesive, or an ultrasonic weld. Both the first and second members 5120, 5080, have chamfered or rounded peripheral surfaces 5200 and 5160, respectively, to facilitate engagement of the hub assembly with the disk drive (e.g., to raise or elevate the medium during loading when the hub assembly contacts the outer surface of the disk drive and thereafter drop a bore 5240 of the hub assembly 5040 onto a disk drive spindle (not shown)). As will be appreciated, the longitudinal center axis of the bore 5240 is substantially aligned or co-axial with the center axis of the disk. In one configuration, the slope $\theta$ (theta) of the surface 5160 ranges from about 20° to about 70° and the slope $\alpha$ (alpha) of the surface 5200 from about 20° to about 70°. The bore 5240 normally has a radius ranging from about 0.5 to about 5 mm.

In one configuration shown in FIG. 20, the first and second members 5120 and 5080 are configured such that the first member 5120 has a surface 5280 adjacent to and spaced a distance "$D_O$" from an adjacent surface 5320 of the disk to prevent damage of the medium by the first member when the first member is engaged or joined with the second member. The offset distance "$D_O$" is typically at least about 0.025 but no more than about 0.5 mm and more typically ranges from about 0.05 to about 0.25 mm.

To provide a raised hub surface to magnetically chuck the medium, the first and second members each include a raised or flat annular area 5330a,b (FIG. 20). The peripheral edge of the areas 5330a,b has a radius "$R_{CA}$" ranging from about 2 to about 5 mm.

In a specific hub configuration shown in FIGS. 17–20 the second member 5080 has first and second concentric rings 5360 and 5400 that define a step 5440 at their junction. The first and second concentric rings are received by the central hole of the disk. Accordingly, portions of the hub assembly are disposed within the central hole of the disk. The central hole 5480 in the first member 5120 telescopically receives the first concentric ring 5360. The diameter of the central hole and the first ring are substantially the same (e.g., the maximum difference in the diameters is no more than about 3 mm) to permit the first and second members to be electrically welded together. The radius of the second ring 5400 typically ranges from about 1.5 to about 4.5 mm and the radius of the first ring 5360 from about 1 to about 4 mm. As noted, the step 5440 is elevated over the surface 5320 of the medium 5000. The step height "$H_S$" is more than the thickness "$T_S$" of the medium 5000 and typically ranges from about 0.025 to about 0.5 mm. The height of the first ring above the second ring is typically no more than the height (or depth) of the central hole in the first member.

FIG. 20 illustrates the low profile of the hub assembly, which is particularly advantageous for a small-form-factor drive. The vertical distance "$D_V$" from a longitudinal center plane 5500 of the medium 5000 to a top of the first member 5120 or bottom of the second member 5080 is typically no more than about 5.5 mm and more typically ranges from about 0.5 to about 4 mm. For a double-sided disk having a hub member on both sides of the disk, the total height "$H_T$" between the outer surfaces of each hub member ranges from about 1 to about 6 mm and more preferably from about 1.5 to about 5 mm. The height "$H_{LM}$" of the first member 5120 is typically more than the height "$H_{UM}$" of the second member 5080. In one configuration, $H_{LM}$ ranges from about 0.035 to about 4 mm.

Another way to characterize the small form factor of the disk is to quantify the ratio between the total height "$H_T$" of the hub assembly and the medium thickness. The ratio exceeds one because the total height of the hub assembly typically exceeds the thickness of the medium. The ratio is at least about 1.5 and more typically at least about 2 (e.g., about 3) but usually no more than about 5.

Figure 22:
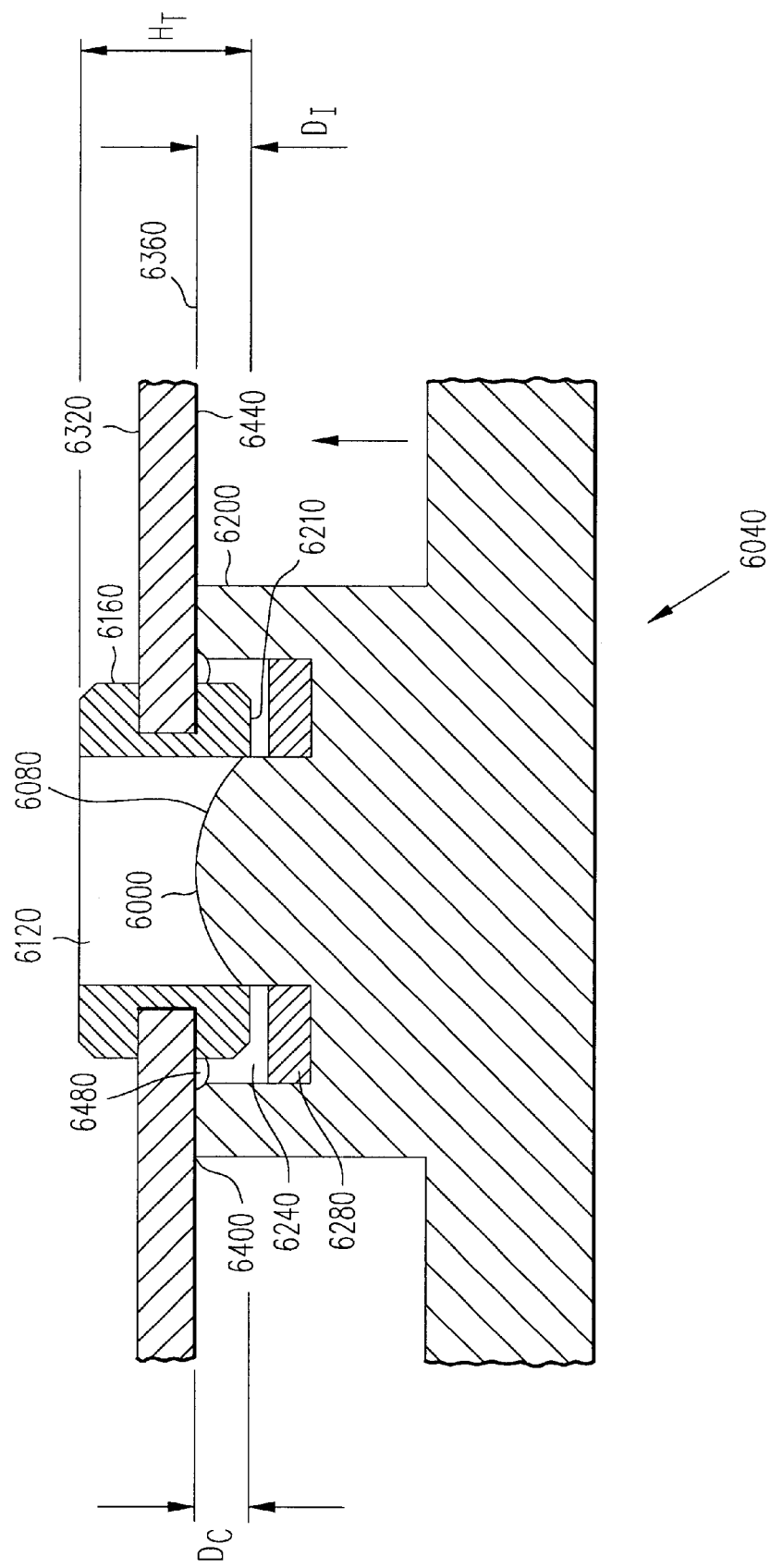
FIG. 22 is a partial cross-sectional view of a drive assembly engaging a hub assembly attached to a medium.
Figure 24:
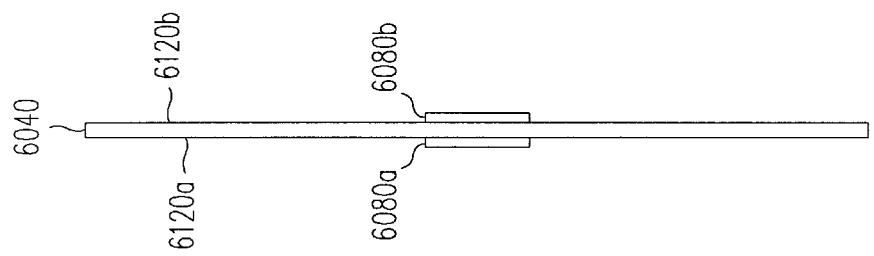
FIG. 24 is a side view of the medium of FIG. 23.
Figure 23:
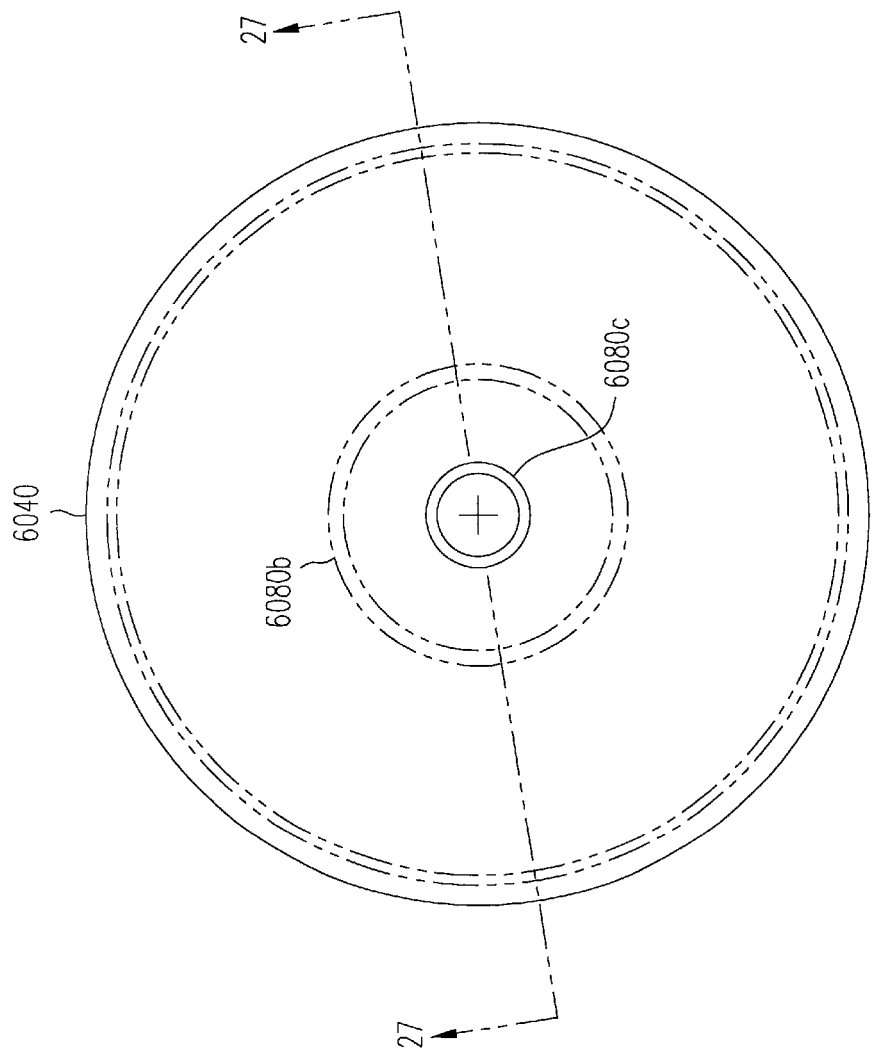
FIG. 23 is a plan view of a medium according to a further embodiment of the present invention.

In another embodiment shown in FIG. 22, a disk mounting and registration interface is provided that includes: a spindle 6000 of a disk drive 6040 having a surface 6080 and which is received in a bore 6120 in the hub 6160, an annular ring 6200 surrounding the spindle 6000 and separated from the spindle 6000 by an annular channel 6240, and a magnet 6280 disposed in the annular channel 6240 to hold the medium 6320 in place (or magnetically chuck the medium) both before and during rotation of the medium 6320 by the disk drive 6040. As will be appreciated, the spindle, annular ring, annular channel, and magnet are associated with a spin motor (not shown). The hub 6160, which can be metal, a metal-filled plastic, or other magnetically attracted material is magnetically attracted to the magnet 6280. The magnet 6280 can be a rare earth magnet having a desired or sufficient magnetic field.

A reference or datum plane 6360 for the disk drive is defined by the surface 6400 of the annular ring 6200. By contacting the medium's surface 6440, the annular ring 6400 ensures that the surface 6440 of the medium 6320 is vertically aligned relative to the reference plane 6360. The ring 6200 contacts the surface 6440 of the medium 6320 interiorly of the lead out track to permit the optical head to read the information on the lead out track. The outer peripheral surface of the ring contacts the medium at a radial distance of no more than about 5.5 mm from the center of the medium.

The surface 6080 of the spindle 6000 and/or inner surface 6480 of the ring 6200 can be chamfered or rounded relative to the surface of the medium 6440 to facilitate centering of the central bore 6120 of the hub 6160 on the spindle 6000. The slope of the surface 6480 (relative to a plane parallel to the plane 6360) preferably ranges from about 20° to about 70° and of the surface 6080 from about 20° to about 70°.

Another important consideration in substantially minimizing the form factor of the disk drive is to substantially minimize the distance which the optical medium must be elevated above the spindle during insertion or removal. Referring to FIG. 22, the distance of insertion of the spindle 6000 into the central bore 6120 of the hub 6160 is relatively small. In one configuration, the distance of insertion "$D_I$" measured from the surface 6210 of the hub 6160 to the highest point of the surface 6080 of the spindle ranges from about 0.1 to about 2.5 mm. Stated another way, the insertion distance "$D_I$" is, in this configuration, at least about 10% and no more than about 50% of the total height of "$H_T$" of the hub 6160. As can be seen from FIG. 22 it is further important that the clearance distance "$D_C$" between the surface 6400 of the annular ring 6200 and the surface 6210 of the hub 6160 disk (which is the same as the height of the hub above the disk operational surface) be maintained as low as possible to provide a low disk drive height.

Figure 17:
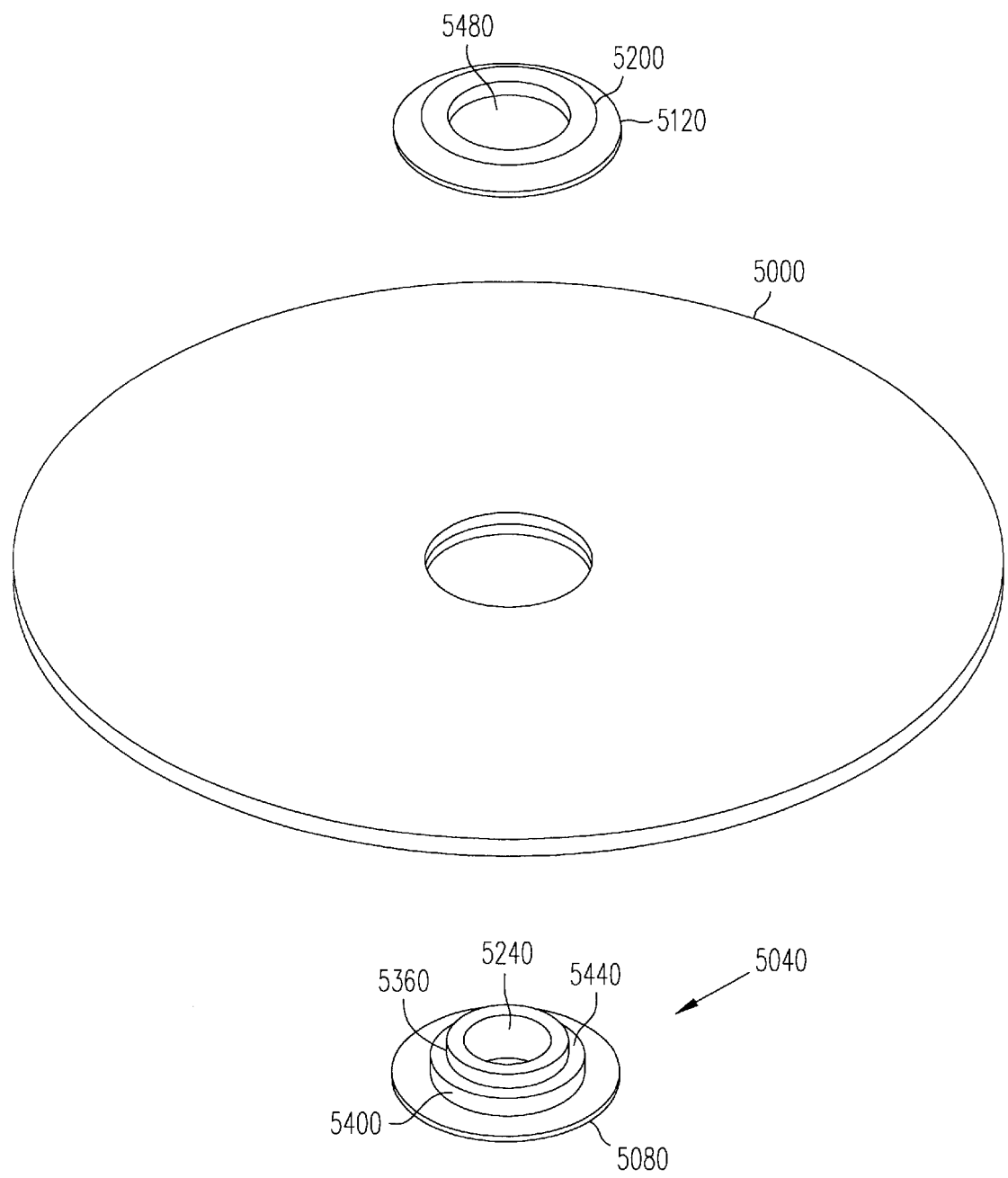
FIG. 17 is a disassembled perspective view of a hub assembly according to one embodiment of the present invention.
Figure 18:
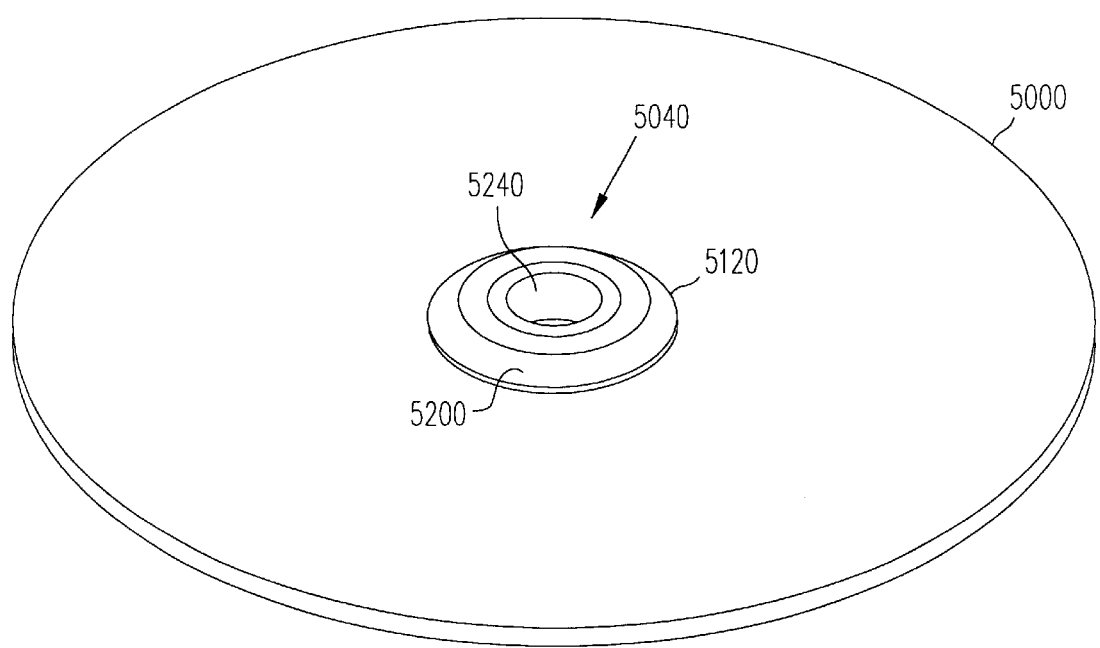
FIG. 18 is another perspective view of the hub assembly of FIG. 17.
Figure 21:
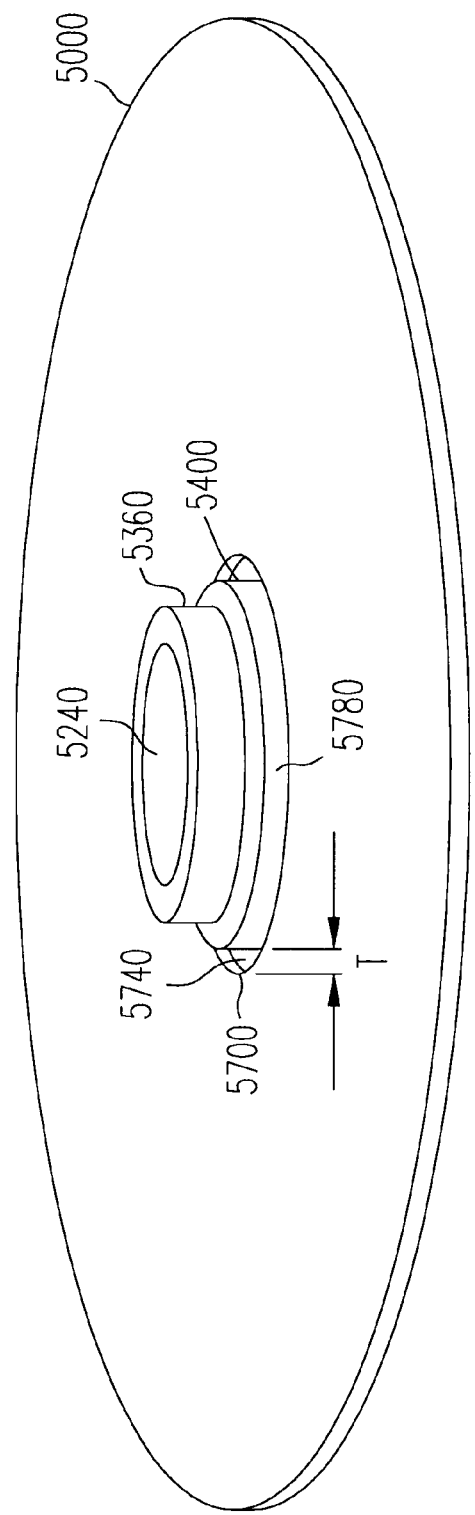
FIG. 21 is a perspective view of a method of engaging the hub assembly of FIGS. 17–20 to a medium.

Regarding the embodiment depicted in FIGS. 17–18 and 21, a method is provided that is useful for a wide variety of optical and nonoptical storage media in which the medium 5000 is thermally "shrink fit" onto the lower member 5080 of the hub assembly 5040. During formation of the medium such as by injection molding or similar embossing procedures, the medium 5000 can be at temperatures just below the glass transition temperature of the medium. According to one set of process parameters, there is a difference in temperature (ΔT) between the temperature of the plastic hub assembly and room temperature (ambient T) in the range of about 50° C.–100° C. Immediately after formation (e.g., removal of the media from the injection mold), the lower member 5080 of the hub assembly 5040, which is typically at a lower temperature than the medium 5000 (especially when the member has substantially the same composition as the media), is inserted through the central bore of the medium 5000. Due to thermal expansion, the central bore is enlarged relative to the size of the central bore after cooling. As the medium cools, the bore shrinks in size to firmly contact the walls of the second ring 5400 of the second hub member 5080. After cooling of the medium 5000, the first member 5120 of the hub assembly 5040 is engaged with the second member 5080 as discussed above.

In one configuration, the medium 5000 has a different chemical composition than the hub member. The medium thermally expands/contracts at a rate higher than the rate of the hub member. Specifically, the medium has a thermal coefficient of expansion ranging from about 1 to about 3 $e^5$, and the hub member 5080 has a thermal coefficient of expansion ranging from about 1 to about 4 $e^6$.

Referring to FIG. 21, the clearance between the interior edge 5700 of the bore 5740 and the peripheral surface 5780 of the second hub member 5080 determines the amount of pre-loading on the medium after cooling of the medium. It is desired that the clearance be sufficiently large to avoid too high a pre-load and/or stress cracking of the medium, especially at low storing/operating temperatures, and sufficiently small to prevent the medium from becoming loose (i.e., to have a line-to-line interference fit between the hub member and the medium) at higher storing/operating temperatures. The linearity of the relationship between cooling rate and medium size reduction permits the proper clearance to be determined accurately for most applications.

The temperature of the hub member is determined by the predetermined amount of preloading on the medium, the clearance, and the relative rates of thermal expansion/contraction of the medium and hub member. The hub member can be chilled, heated, or held at ambient temperature prior to insertion into the central hole. Typically, the hub member is at ambient temperature and is therefore at a lower temperature than the medium upon engagement of the two components.

The method provides a hub having a high degree of concentricity relative to the tracks of the medium. The hub member is typically machined by turning and therefore has a high degree of concentricity. Shrink fitting of the medium to the hub imparts the concentricity of the hub to the tracks of the medium. The shrink fit further reduces the likelihood of losing radial or vertical alignment of the medium.

Another embodiment of a hub assembly is depicted in FIGS. 23–27. The medium 6040 has raised circular extensions 6080a,b, c, d formed on either side 6120a,b of the medium 6040 to receive and locate a corresponding magnetically attracted coupling plate 6160a,b and assist in centering the medium 6040. The extensions 6080a,b, c, d are concentrically disposed around the center of the medium 6040. Alternatively, each pair of extensions 6080b,c and 6080a,d can be concentrically disposed about different points rather than the same point. As can be seen in FIG. 25, the plates 6160a,b have holes 6240 that receive and are radially centered on either side of the medium by the circular extensions 6080a,b. In one configuration, the extensions are formed in the medium, such as during injection molding or other kinds of embossing. As will be appreciated, the extensions can alternatively be located outside of the plates to center the plates about the center bore of the medium.

Yet another embodiment of a snap-fit hub assembly is depicted in FIGS. 28–30. In the hub 7000, a plurality of fingers 7040a–d, that are molded into the medium substrate, project outwardly on either side of the medium 7080. Each finger includes a chamfered projecting lip 7120a–d that projects radially outwardly from the outer wall 7160a–d of the finger. The fingers are paired 7040a, c and 7040b, d such that each set of paired fingers has a lip 7120a,c and b,d, respectively, located on the same side of the medium. A magnetically attracted washer (not shown) is interference or snap fit over the respective chamfered lips on each side of the disk. Thus, the thickness of the washer is no more than and typically approximately the same as the height "$H_F$" of the inward base of the lip 7120a–d over the adjacent surface of the medium 7080. A chamfered pair of sidewalls 7200a–d (7200b is not shown) project outwardly on either side of the medium 7080 and, as in the case of the fingers, are molded into the substrate. The chamfered surfaces 7240a–d (7240b is not shown) facilitate alignment of the spindle (not shown) with the central bore 7280 of the medium. A hole 7320a–d is located between the corresponding outer wall 7160a–d and the medium 7080 to permit a molding tool (not shown) to be removed after formation of the medium. The fingers 7040a–d are offset by approximately 90° from the adjacent fingers 7040a–d (which have lips on opposite sides of the medium) and 180° from the other finger 7040a–d (which has a lip on the same side of the medium) to also permit removal of the molding tool. The snap or interference fit of this embodiment substantially eliminates the need for adhesives in engaging the washers with the medium.

Figure 31:
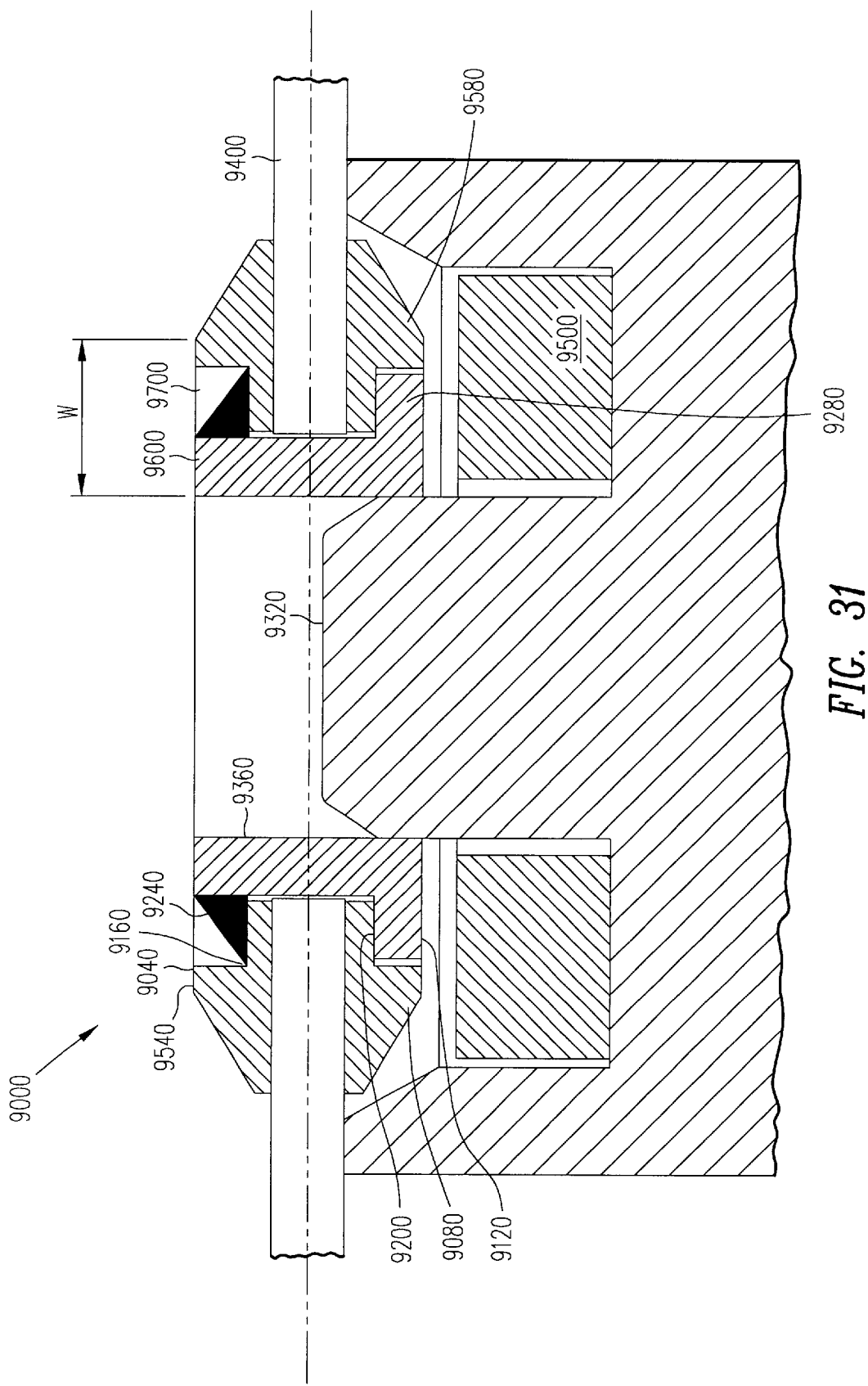
FIG. 31 is a sectional view of a hub assembly of an additional embodiment positioned in a disk drive.

Yet a further embodiment of a hub assembly is shown in FIG. 31. The hub assembly 9000 includes three pieces, namely first and second magnetic couplings or washers 9040 and 9080, and a sleeve 9120, which typically has the same composition as the disk or the substrate for the disk. The magnetic couplings 9040 and 9080 each include inner annular steps 9160 and 9200, one for receiving an adhesive 9240 and the other for engaging a matching annular step 9280 in the sleeve 9120. The outer surfaces of the magnetic couplings are chamfered to facilitate engagement with the disk drive spindle 9320. Because the spindle 9320 is received in the bore 9360 of the sleeve 9120, the medium 9400 rigidly engages the outer wall of the sleeve 9120 such as by an interference or line-to-line fit. As will be appreciated, a sufficient area of the magnetic couplings must be adjacent to the magnet 9500 for magnetic chucking to occur efficiently. Accordingly, each of the magnetic couplings 9040, 9080 includes a flat annular area 9540 and 9580 near the center of the disk and adjacent to the magnet 9500. The width "W" of the flat areas 9540 and 9580 typically ranges from about 0.5 to about 5 mm. As will be appreciated, the hub assembly 9000 is assembled by first placing the cylindrical portion 9600 of the sleeve 9120 through the central bore of the magnetic coupling 9080, second placing the cylindrical portion of the sleeve through the central bore of the medium 9400, third placing the cylindrical portion of the sleeve through the central bore of the magnetic coupling 9040, and finally applying an adhesive, which can be any suitable adhesive with adhesives requiring an ultraviolet cure being more preferred, in the annular channel 9700 defined by the disk 9040 and the sleeve 9120.

The hub assembly requires no fixturing, substantially eliminates potential adhesive on the disk chucking surface, allows the magnetic washers to "float" (e.g., to have some degree of freedom of movement in the lateral or side-to-side direction because the interior edge 9800a,b of each disk 9040 and 9080 is spaced from the adjacent surface of the sleeve 9120), and requires adhesive to be applied only to one side of the hub assembly.

Figure 32:
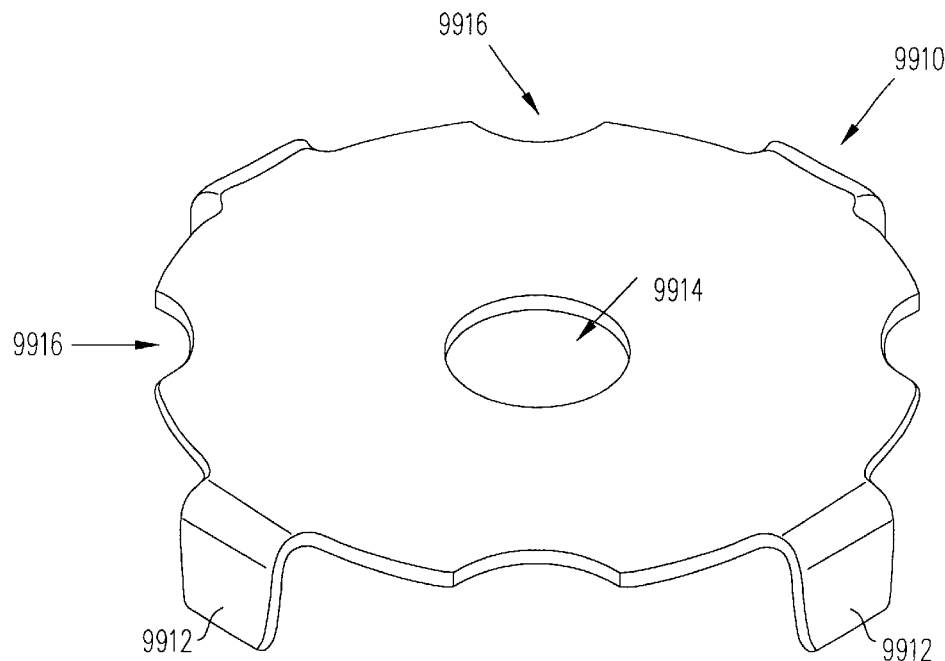
FIG. 32 is a perspective view of another embodiment of a metal hub plate.
Figure 33:
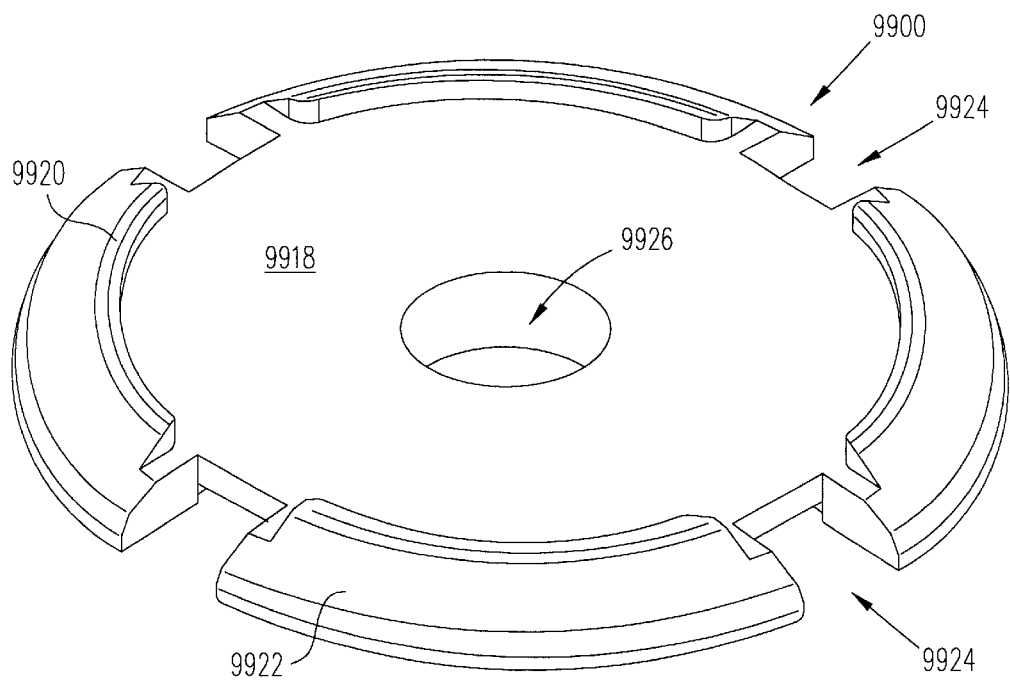
FIG. 33 is a perspective view of another embodiment of a hub member.
Figure 35:
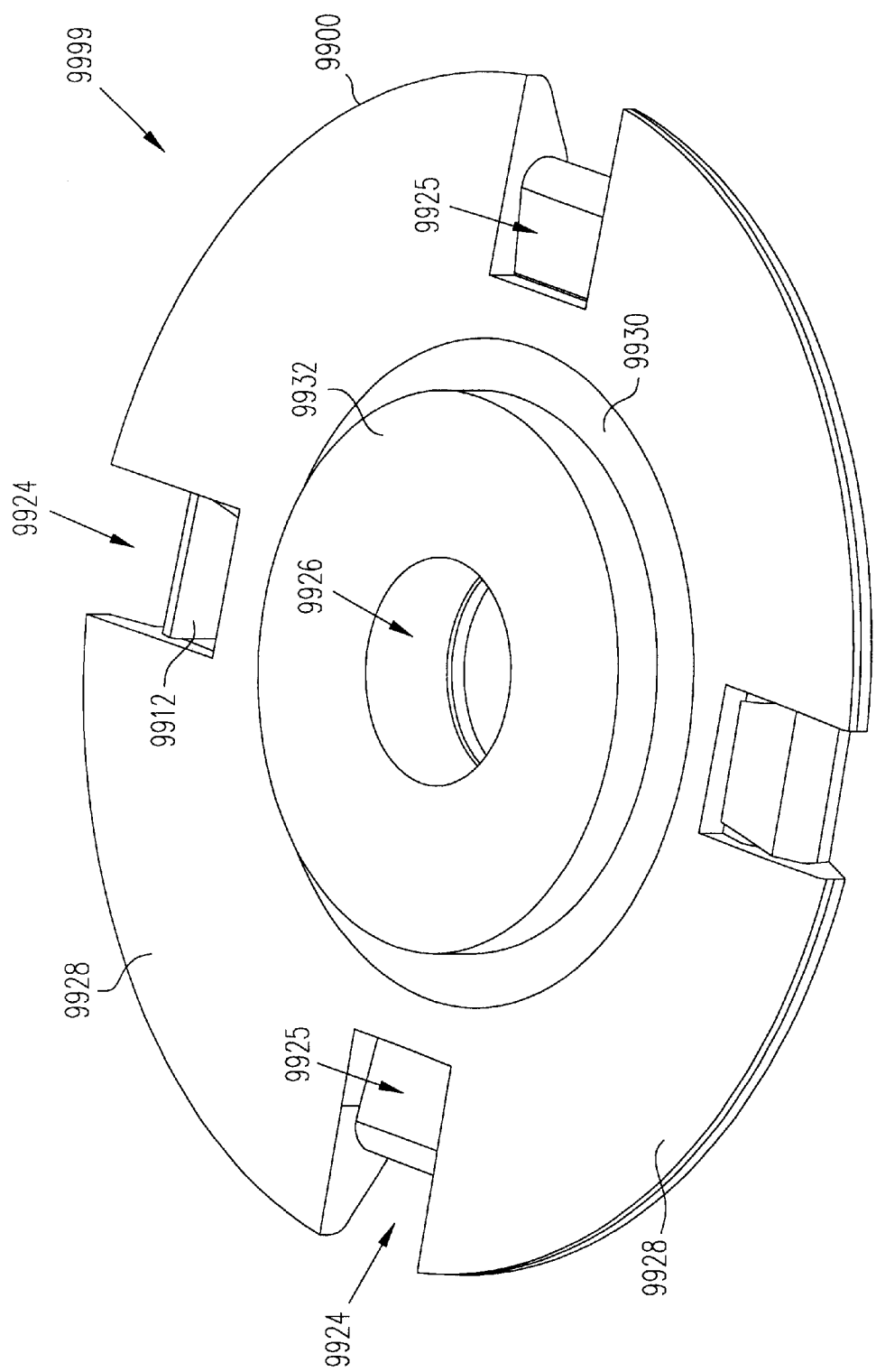
FIG. 35 is a bottom perspective view of the metal hub plate of FIG. 32 assembled to the hub member of FIG. 33.

FIGS. 32–37 illustrate another embodiment according to the invention, including a hub member 9900 (FIG. 33) and a metal hub plate 9910 (FIG. 32). FIG. 35 shows a hub assembly 9999 which includes hub member 9900 and metal hub plate 9910. Hub member 9900 can be molded from polycarbonate, optical grade (O.G.) plastic, for example. The top side of hub member 9900 contains a wall or rim 9920 which defines a circular recessed area 9918 where the metal hub plate 9910 fits. Radially outward from rim 9920 is a sloped area 9922 which terminates at the edge of the hub member 9900. In one embodiment, circular recessed area 9918 has a diameter of 6.08 mm, and the outside diameter of hub member 9900 is 7.70 mm. A central hole 9926 can be 1.60 mm in diameter, for example, and is formed about a central axis of hub member 9900. Four notches 9924 are formed around the circumference of hub member 9900 and, as shown in the bottom view of FIG. 35, on the underside of hub member 9900 four recessed areas 9925 are located radially inward from notches 9924. Notches 9924 can be tapered so that they are slightly wider at the outer periphery of hub member 9900 than where they adjoin recessed areas 9925.

Referring still to FIG. 34, on the underside of hub member 9900 is an annular bonding surface 9928, where hub assembly 9999 is bonded to a data storage disk, and an overflow channel 9930, which holds excess adhesive used to bond hub assembly 9999 to a disk. Also on the underside of hub member 9900 is a boss 9932, which is a raised area that fits into a center hole of the data storage disk. Preferably, hub assembly 9999 and another similar hub assembly 9998 are mounted on opposite sides of a disk 9940, as shown in FIG. 36, and therefore the height of boss 9932 is approximately equal to one-half the thickness of the disk 9940. In one embodiment the height of boss 9932 above annular surface 9928 is equal to 0.287 mm.

FIGS. 32 and 34 are perspective and top views, respectively, of metal hub plate 9910. Metal hub plate 9910 can be made of AISI 430 SS-Soft, for example, and is preformed as shown, with tabs 9912 bent 90 degrees from the main surface. The sheet metal may be 0.127 mm thick. Central hole 9914 can be 1.425 mm in diameter. The diameter of metal hub plate can be 5.97 mm. Tabs 9912 can be 1.060 mm long and 1.00 mm wide at their base and may taper to a width of 0.80 mm at their outer end. The metal may be finished with Type VIII nitric acid passivation. Four notches 9916 in the shape of circular arcs are formed at the perimeter of metal hub plate 9910. Metal hub plates preformed as shown in FIGS. 32 and 34 are available from Belton Industrial Ltd. of Hong Kong. Metal hub plate 70 has a central axis X2.

FIG. 35 shows how tabs 9912 are bent around hub member 9900 and fit into notches 9912 and recessed areas 9925 in the completed assembly 9999 of metal hub plate 9910 and hub member 9900.

The structure and function of hub assembly 9999 are somewhat similar to those of hub assembly 4100, shown in FIGS. 12–16. For example, the presence of metal hub plate 9910 allows hub assembly 9999 to be magnetically clamped to a spindle of a disk drive. There are significant differences, however, between hub assembly 4100 and hub assembly 9999. Neither hub member 9900 nor metal hub plate 9910 contain adhesive injection ports. UV curable adhesive has been found to be particularly effective as an adhesive, and UV curable adhesive is generally too viscous to allow it to be injected through ports. The UV curable adhesive is preferably applied to the hub members and/or disk before these two components are brought together for positioning the hub member with respect to the data regions. Second, metal hub plate 9910 contains the notches 9916, which allow it to be registered correctly with respect to the die that is used to bend tabs 9912 into notches 9924, as described in the above-referenced application Ser. No. 09/745,597.

In addition, hub plate 9900 includes boss 9932 which merges with another boss of a similar hub member, at an interface 9942 shown in FIG. 36, when two hub assemblies 9999, 9998 are mounted on a data storage disk. Note that the diameter of the boss 9932 is slightly less than the inside diameter of the central hole of the disk 9940, which allows each hub member to be positioned independently at the geometric center of the data region on one side of the disk. Permitting the bosses to be bonded to each other creates a much stronger bond between the hub assemblies and the disk. It has been found that, using a UV adhesive, the bond between the polycarbonate hub members is 4 times as strong, per unit area, as the bond between the hub member and the metal film that is typically on the surface of the disk (interface 9944 shown in FIG. 36). Overall, the strength of the bond between the hub assemblies and the disk in the configuration shown in FIG. 36, is about 10 times greater than if there were no bond between the hub members.

Figure 37:
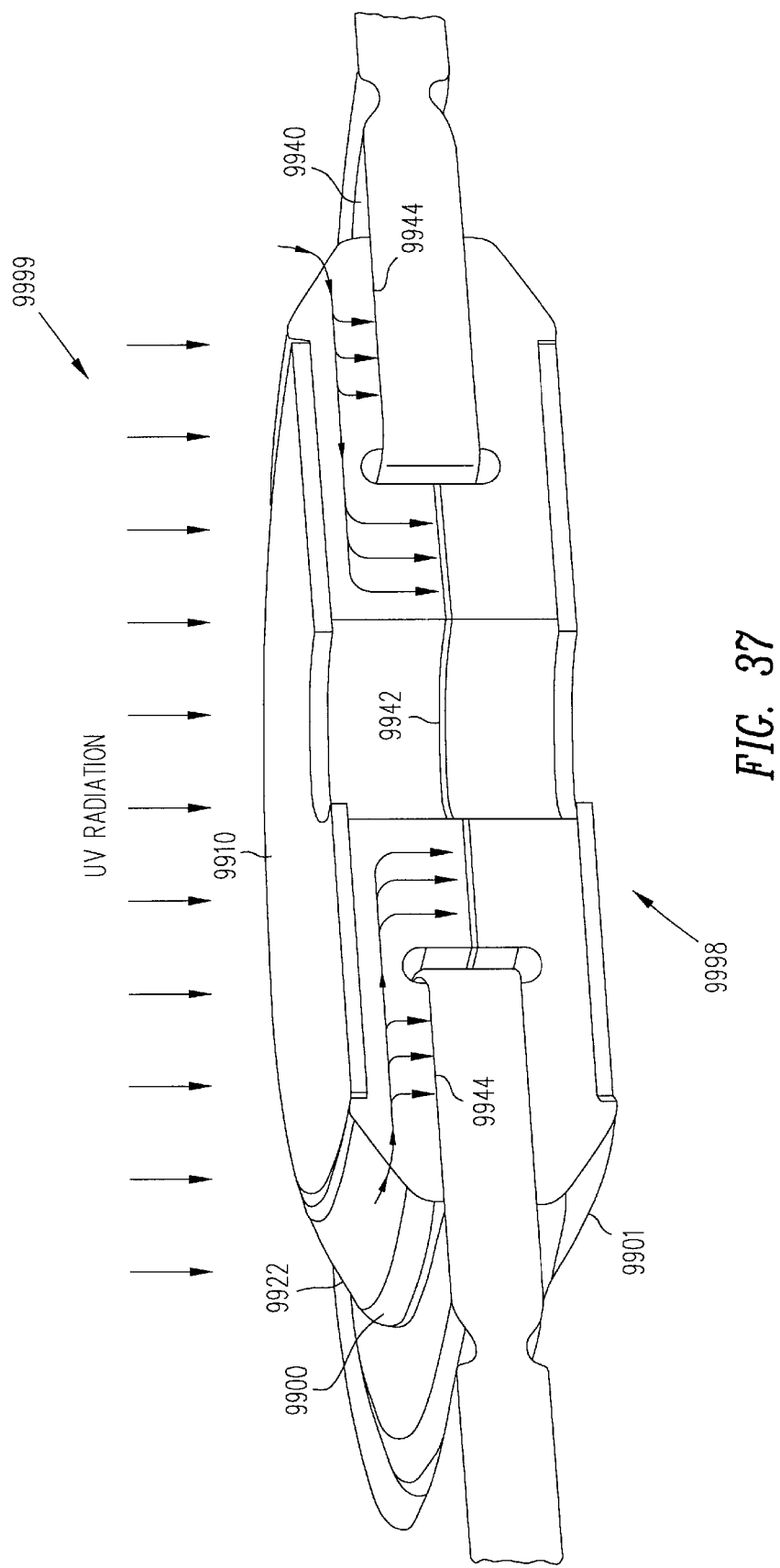
FIG. 37 is a view similar to FIG. 36, showing the path of UV radiation through the hub members.

As shown in FIG. 37, forming the hub members 9900, 9901 of a UV-transmissive material such as optical grade polycarbonate causes the hub members to function as light pipes when exposed to UV radiation. The UV radiation enters the hub member 9900 through the exposed surfaces 9922, radially outward from metal hub plate 9910, and is reflected from the surfaces of the hub member 9900 until it reaches the interfaces 9942, 9944, where it cures the UV adhesive, creating bonds between hub members 9900, 9901 at interface 9942 and between hub member 9900 and disk 9940 at interface 9944. The structure is inverted and the same process is performed to bond hub assembly 9998 to disk 9940.

As supported by the foregoing descriptions, the optical media and systems of the present invention can be used in connection with numerous and various applications of data storage including storing data for use by computers such as personal computers, laptops, work stations and the like, digital camera data storage, storage for music or other audio purposes, including storage for MP3 players, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the storage system and/or medium of the present invention in a wide variety of devices, e.g. to provide for ease of sharing, storing or transmitting of data, e.g. between platforms including, but not limited to devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the foregoing disclosures. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A magnetic hub assembly for a data storage disk comprising:

a hub member having a top side and a bottom side, said hub member defining a plurality of notches formed on the circumference of the hub member, and defining recessed areas on said bottom side located radially inward from said notches; and a metal hub plate having a plurality of tabs corresponding to said plurality of notches and extending 90 degrees from said top side, said tabs having a first end configured to be inserted into said plurality of notches from said top side and bent around said notches and inserted into said recessed areas on said bottom side and said metal hub plate having a plurality of notches in the shape of a circular arc for aligning the metal hub plate with a die during assembly of the hub member and metal hub plate.

2. The magnetic hub assembly of claim 1, wherein said plurality of notches are wider at the periphery of said hub member than at a location radially inward.

3. The magnetic hub assembly of claim 1, wherein said bottom side comprises an annular bonding surface.

4. The magnetic hub assembly of claim 1, wherein said bottom side comprises an overflow channel to hold excess adhesive.

5. The magnetic hub assembly of claim 1, wherein said bottom side comprises a boss which is sized to fit into a hole defined on the data storage disk.

6. The magnetic hub assembly of claim 5, wherein a height of said boss is equal to one-half the thickness of said data storage disk.

7. The magnetic hub assembly of claim 1, wherein said metal hub plate comprises AISI 430 SS-Soft.

8. The magnetic hub assembly of claim 1, wherein said tabs comprise a length of about 1 mm and a width of about 1 mm.

9. The magnetic hub assembly of claim 1, wherein said tabs are tapered from width of about 1 mm to a width of about 0.8 mm.

10. The magnetic hub assembly of claim 1, wherein said metal hub plate defines a central hole.

* * * * *